US011124444B2

(12) United States Patent
Comte et al.

(10) Patent No.: US 11,124,444 B2
(45) Date of Patent: *Sep. 21, 2021

(54) ION EXCHANGEABLE LI-CONTAINING GLASS COMPOSITIONS FOR 3-D FORMING

(71) Applicant: CORNING INCORPORATED, Corning, NY (US)

(72) Inventors: Marie Jacqueline Monique Comte, Fontenay aux Roses (FR); Melinda Ann Drake, Corning, NY (US); Karen Leslie Geisinger, Big Flats, NY (US); Sinue Gomez, Corning, NY (US); Robert Michael Morena, Lindley, NY (US); Charlene Marie Smith, Corning, NY (US); Randall Eugene Youngman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,893

(22) Filed: Nov. 6, 2018

(65) Prior Publication Data
US 2019/0092679 A1 Mar. 28, 2019

Related U.S. Application Data

(62) Division of application No. 14/824,653, filed on Aug. 12, 2015, now Pat. No. 10,150,691, which is a division of application No. 13/938,579, filed on Jul. 10, 2013, now Pat. No. 9,139,469.

(60) Provisional application No. 61/672,346, filed on Jul. 17, 2012.

(51) Int. Cl.
| C03C 3/085 | (2006.01) |
| C03C 3/087 | (2006.01) |
| C03C 3/097 | (2006.01) |
| C03C 3/089 | (2006.01) |
| C03C 21/00 | (2006.01) |
| C03C 3/083 | (2006.01) |
| C03C 3/091 | (2006.01) |
| C03C 3/093 | (2006.01) |
| C03C 4/18  | (2006.01) |

(52) U.S. Cl.
CPC ............. *C03C 3/097* (2013.01); *C03C 3/083* (2013.01); *C03C 3/085* (2013.01); *C03C 3/087* (2013.01); *C03C 3/089* (2013.01); *C03C 3/091* (2013.01); *C03C 3/093* (2013.01); *C03C 4/18* (2013.01); *C03C 21/002* (2013.01); *Y10T 428/315* (2015.01)

(58) Field of Classification Search
CPC .......... C03C 3/083; C03C 3/085; C03C 3/087
See application file for complete search history.

(56) References Cited

U.S. PATENT DOCUMENTS

| 3,485,647 A | 12/1969 | Harrington |
| 3,981,707 A | 9/1976 | Araujo et al. |
| 4,792,535 A | 12/1988 | Fine |
| 4,925,814 A | 5/1990 | Fine |
| 5,674,790 A | 10/1997 | Araujo |
| 5,972,460 A | 10/1999 | Tachiwana |
| 6,121,175 A | 9/2000 | Drescher et al. |
| 6,170,995 B1 | 1/2001 | Mitachi et al. |
| 6,413,892 B1 | 7/2002 | Koyama et al. |
| 6,436,859 B1 | 8/2002 | Muramoto et al. |
| 6,440,531 B1 | 8/2002 | Kurachi et al. |
| 7,192,898 B2 | 3/2007 | Mori et al. |
| 7,406,243 B2 | 7/2008 | Takeuchi et al. |
| 7,727,917 B2 | 6/2010 | Shelestak et al. |
| 8,043,706 B2 | 10/2011 | Goto et al. |
| 8,168,313 B2 | 5/2012 | Endo et al. |
| 8,652,979 B2 | 2/2014 | Murata |
| 8,691,711 B2 | 4/2014 | Nakashima et al. |
| 8,778,820 B2 | 7/2014 | Gomez et al. |
| 9,016,092 B2 | 4/2015 | Hachitani et al. |
| 9,139,469 B2 * | 9/2015 | Comte ................. C03C 21/002 |

(Continued)

FOREIGN PATENT DOCUMENTS

| CN | 1643419 A | 7/2005 |
| CN | 1886348 A | 12/2006 |

(Continued)

OTHER PUBLICATIONS

"Glass Material Design System: Vitres"; by Asao Makishima, et al, Fujitsu, Japan Nov. 10, 1993, vol. 44, No. 6 pp. 560-565, ISSN:0016-2515.
English Translation of JP2017079571 Office Action dated Apr. 3, 2018; 4 pages; Japanese Patent Office.
Korean Patent Application No. 1020157004398; English Translation of the Office Action dated Sep. 21, 2019; Korea Patent Office; 3 Pgs.
European Patent Application No. 13739597.6; Office Action dated Sep. 24, 2019; Korea Patent Office; 7 Pgs.
English Translation of CN201380038312.5 Notice of First Office Action dated August 4, 2016; 11 pages; Chinese Patent Office.
Behrens et al; "Near-Infrared Spectroscopic Determination of Water Species in Glasses of the System MAlSi3O8 (M=Li, Na, K): an Interlaboratory Study"; Chemical Geology, 128, (1996), 41-63.

(Continued)

Primary Examiner — Karl E Group
(74) Attorney, Agent, or Firm — Timothy M. Schaeberle; Jeffrey A. Schmidt

(57) ABSTRACT

According to one embodiment, a glass article may include $SiO_2$, $Al_2O_3$, $Li_2O$ and $Na_2O$. The glass article may have a softening point less than or equal to about 810° C. The glass article may also have a high temperature CTE less than or equal to about $27 \times 10^{-6}$/° C. The glass article may also be ion exchangeable such that the glass has a compressive stress greater than or equal to about 600 MPa and a depth of layer greater than or equal to about 25 μm after ion exchange in a salt bath comprising $KNO_3$ at a temperature in a range from about 390° C. to about 450° C. for less than or equal to approximately 15 hours.

8 Claims, 7 Drawing Sheets

(56) References Cited

U.S. PATENT DOCUMENTS

| | | | |
|---|---|---|---|
| 9,212,084 B2 | 12/2015 | Wang et al. | |
| 9,688,573 B2 | 6/2017 | Kurachi et al. | |
| 10,150,691 B2* | 12/2018 | Comte | C03C 3/083 |
| 10,183,887 B2* | 1/2019 | Comte | C03C 21/002 |
| 2002/0193233 A1 | 12/2002 | Kishimoto et al. | |
| 2003/0109370 A1 | 6/2003 | Ikenishi et al. | |
| 2003/0144125 A1 | 7/2003 | Anma et al. | |
| 2003/0232169 A1 | 12/2003 | Kawai | |
| 2009/0075805 A1 | 3/2009 | Kurachi et al. | |
| 2009/0142568 A1 | 6/2009 | Dejneka et al. | |
| 2009/0220761 A1 | 9/2009 | Dejneka et al. | |
| 2010/0035745 A1 | 2/2010 | Murata | |
| 2010/0087307 A1 | 4/2010 | Murata et al. | |
| 2010/0167091 A1 | 7/2010 | Tachiwana et al. | |
| 2010/0190038 A1 | 7/2010 | Osakabe et al. | |
| 2010/0255350 A1 | 10/2010 | Endo et al. | |
| 2011/0014475 A1 | 1/2011 | Murata | |
| 2011/0045961 A1 | 2/2011 | Dejneka et al. | |
| 2011/0064951 A1 | 3/2011 | Fujiwara et al. | |
| 2011/0071012 A1 | 3/2011 | Kondo et al. | |
| 2011/0086241 A1 | 4/2011 | Hachitani et al. | |
| 2011/0151261 A1 | 6/2011 | Fujiwara et al. | |
| 2011/0294649 A1 | 12/2011 | Gomez et al. | |
| 2011/0312483 A1 | 12/2011 | Nakashima et al. | |
| 2012/0052271 A1 | 3/2012 | Gomez et al. | |
| 2012/0100397 A1 | 4/2012 | Endo et al. | |
| 2012/0171497 A1 | 7/2012 | Koyama et al. | |
| 2012/0188663 A1 | 7/2012 | Isono et al. | |
| 2012/0321898 A1 | 12/2012 | Meinhardt et al. | |
| 2013/0189486 A1 | 7/2013 | Wang et al. | |
| 2013/0231236 A1 | 9/2013 | Kawai et al. | |
| 2013/0302617 A1 | 11/2013 | Akiba et al. | |
| 2014/0011035 A1 | 1/2014 | Senshu et al. | |
| 2014/0023865 A1* | 1/2014 | Comte | C03C 21/002 428/410 |
| 2014/0050911 A1 | 2/2014 | Mauro et al. | |
| 2014/0356576 A1 | 12/2014 | Dejneka et al. | |
| 2015/0140325 A1 | 5/2015 | Gross et al. | |
| 2015/0344351 A1* | 12/2015 | Comte | C03C 3/085 428/410 |
| 2016/0107924 A1 | 4/2016 | Yamamoto et al. | |
| 2018/0022638 A1* | 1/2018 | Comte | C03C 21/002 428/410 |

FOREIGN PATENT DOCUMENTS

| | | | |
|---|---|---|---|
| CN | 101279818 A | 10/2008 | |
| CN | 101522584 A | 9/2009 | |
| CN | 101575167 A | 11/2009 | |
| CN | 102092940 A | 6/2011 | |
| EP | 0909967 A1 | 4/1999 | |
| EP | 1486806 A1 | 12/2004 | |
| EP | 2036867 | 3/2009 | |
| EP | 2540682 | 1/2013 | |
| GB | 1026770 A | 4/1966 | |
| GB | 1322510 A | 7/1973 | |
| JP | 62187140 A | 8/1987 | |
| JP | 7172863 A | 7/1995 | |
| JP | 10001329 A | 1/1998 | |
| JP | 11180728 A | 7/1999 | |
| JP | 2001019466 A | 1/2001 | |
| JP | 2001139342 A | 5/2001 | |
| JP | 2002025040 A | 1/2002 | |
| JP | 2002167230 A | 6/2002 | |
| JP | 2002211946 A | 7/2002 | |
| JP | 2002255585 A | 9/2002 | |
| JP | 2002260216 A | 9/2002 | |
| JP | 2003030816 A | 1/2003 | |
| JP | 2003099913 A | 4/2003 | |
| JP | 2004206741 A | 7/2004 | |
| JP | 2004352571 A | 12/2004 | |
| JP | 2006290704 A | 10/2006 | |
| JP | 2008115071 A | 5/2008 | |
| JP | 2009013052 | 1/2009 | |
| JP | 2009084076 A | 4/2009 | |
| JP | 2011505323 A | 2/2011 | |
| JP | 2011084456 A | 4/2011 | |
| KR | 2011094229 | 8/2011 | |
| KR | 2011094229 A | 8/2011 | |
| KR | 2011095427 | 8/2011 | |
| KR | 2011095427 A | 8/2011 | |
| KR | 20110094229 | 8/2011 | |
| KR | 20110095427 | 8/2011 | |
| WO | 2009019965 | 2/2009 | |
| WO | 2011103798 | 9/2011 | |
| WO | 2011103799 | 9/2011 | |
| WO | 2011104035 | 9/2011 | |
| WO | 2011144024 | 11/2011 | |
| WO | 2011149740 A1 | 12/2011 | |
| WO | 2012128180 | 9/2012 | |
| WO | 2015033800 A1 | 3/2015 | |
| WO | 2016174825 A1 | 11/2016 | |

OTHER PUBLICATIONS

Hahnert et al; "Cation exchange in silicate glass (III)"; Silikattechnik, 20, (1969) vol. 4. p. 116-120.

Lants N.I. "Acid-resistance and fusibility of the $SiO_2$—$R_2O_3$—$R_2O$ system glasses as the base for instrument enamels" Zh.Prikl. Khim., 1972, vol. 45, No. 3, p. 495-499.

Sakka et al; "Viscosities of Mixed Alkali Aluminosilicate Glasses of the System $Li_2O$—$Na_2O$—$Al_2O_3$—$SiO_2$"; Res. Rep. Fac. Eng. Mie Univ., vol. 6; pp. 81-92 (1981).

Tyagi et al; "Measurement of Progressive Stress Buildup During Ion Exchange in Alkali Aluminosilicate Glass"; Journal of Non-Crystalline Solids; 238 (1998) 186-192.

TW102125411 Search Report dated Nov. 21, 2016, Taiwan Patent Office.

English Translation of JP2015523150 Office Action dated Oct. 4, 2016, Japan Patent Office.

English Translation of CN201380038312.5 Notice of First Office Action dated Aug. 4, 2016; Chinese Patent Office.

English Translation of JP2015523150 Office Action dated Mar. 7, 2017, Japan Patent Office.

International Search Report and Written Opinion for Application No. PCT/US2013/050442 dated Oct. 14, 2013.

International Preliminary Report on Patentability for Application No. PCT/US2013/050442 dated Jan. 29, 2015.

European Patent Application No. 19211008.8; Office Action dated Mar. 6, 2020; European Patent Office; 8 Pgs.

Chinese Patent Application No. 201380038312.5, Office Action dated Oct. 30, 2020; 15 pages (English Translation Only); Chinese Patent Office.

Extended European Search Report and Search Opinion; 19211008.8; dated Mar. 6, 2020; 8 pages; European Patent Office.

* cited by examiner

ION EXCHANGEABLE LI-CONTAINING GLASS COMPOSITIONS FOR 3-D FORMING

CROSS REFERENCE TO RELATED APPLICATIONS

This application is a divisional of U.S. application Ser. No. 14/824,653 filed on Aug. 12, 2015, which issued as U.S. Pat. No. 10,150,691 on Dec. 11, 2018, which in turn is a divisional of U.S. Application application Ser. No. 13/938, 579 filed on Jul. 10, 2013, which issued as U.S. Pat. No. 9,139,469 on Sep. 22, 2015, which in turn claims the benefit of priority under 35 U.S.C. § 119 of U.S. Provisional Patent Application Ser. No. 61/672,346 filed Jul. 17, 2012 and entitled "Ion Exchangeable Li-Containing Glass Compositions For 3-D Forming," the entirety of each is hereby incorporated by reference.

BACKGROUND

Field

The present specification generally relates to glass compositions suitable for use in 3-D forming applications and, more specifically, to ion exchangeable, Li-containing glass compositions suitable for 3-D forming.

Technical Background

Ion exchangeable glass compositions are widely used as cover glasses in many electronic devices including mobile telephones, personal media players, tablet computers and the like. The cover glasses used in these applications are generally flat and planar. As such, the cover glasses may be formed using conventional glass forming processes, such as down draw processes and/or float processes.

One limiting factor in the aesthetic design of electronic devices is the ability to shape the cover glasses to conform to curved and/or complex contours. Glass compositions which are amenable to ion exchange generally have relatively high softening points, making the glass compositions difficult to form into 3-D shapes using elevated temperature forming processes such as vacuum sagging. As a result of the relatively high softening points, the glass compositions tend to react with the material of the mold, sticking to the mold and/or degrading the mold, even when protective coatings are applied to the mold.

Accordingly, a need exists for alternative glass compositions suitable for use in elevated temperature 3-D forming processes and which are also amenable to strengthening by ion exchange processing.

SUMMARY

According to one embodiment, a glass article may include $SiO_2$, $Al_2O_3$, $Li_2O$ and $Na_2O$. The glass article may have a softening point less than or equal to about 810° C. The glass article may also have a high temperature coefficient thermal expansion ("CTE") less than or equal to about $27 \times 10^{-6}/$° C. The glass article may also be ion exchangeable such that the glass has a compressive stress greater than or equal to about 600 MPa and a depth of layer greater than or equal to about 25 μm after ion exchange in a salt bath comprising $KNO_3$ at about 410° C. in a temperature range from about 390° C. to about 450° C. for less than or equal to approximately 15 hours.

In another embodiment, a glass composition may include from about 65.8 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; and from about 0.8-10 mol. % of a divalent oxide, wherein the divalent oxide includes at least one of MgO and ZnO; and less than about 0.5 mol. % $B_2O_3$. A sum of a concentration of $Al_2O_3$ (mol. %) and a concentration of the divalent oxide (mol. %) may be greater than 10 mol %. The glass composition may have a softening point less than or equal to about 810° C. The glass composition may also have a high temperature coefficient thermal expansion ("CTE") less than or equal to about $27 \times 10^{-6}/$° C. These glass compositions may be substantially free of $ZrO_2$.

In yet another embodiment, a glass composition may include from about 55 mol. % to about 68 mol. % $SiO_2$; from about 9 mol. % to about 15 mol. % $Al_2O_3$; from about 4.5 mol % to about 12 mol. % $B_2O_3$; from about 1 mol. % to about 7 mol. % $Li_2O$; from about 3 mol. % to about 12 mol. % $Na_2O$; and from about 0 mol. % to about 3 mol. % $K_2O$. In this embodiment, $R_2O$ is a sum of a concentration of $Li_2O$, a concentration of $Na_2O$, and a concentration of $K_2O$. The ratio of $R_2O$ to a concentration of $Al_2O_3$ is less than or equal to about 1.5. The glass composition may have a softening point less than or equal to about 810° C. The glass composition may also have a high temperature CTE less than or equal to about $27 \times 10^{-6}/$° C.

In yet another embodiment, a glass composition may include from about 65 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; from about 0 mol. % to about 5 mol. % $K_2O$; from about 0.8 to about 10 mol. % of a divalent oxide, wherein the divalent oxide comprises at least one of MgO and ZnO; from about 0.5 mol. % to about 2 mol. % $ZrO_2$; and less than about 0.5 mol. % $B_2O_3$, wherein: the sum of the concentration of $Al_2O_3$ (mol. %), and the concentration of the divalent oxide (mol. %) is greater than about 10 mol %. The glass composition has a softening point less than or equal to about 810° C.; and a high temperature CTE less than or equal to about $27 \times 10^{-6}/$° C.

Additional features and advantages of the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
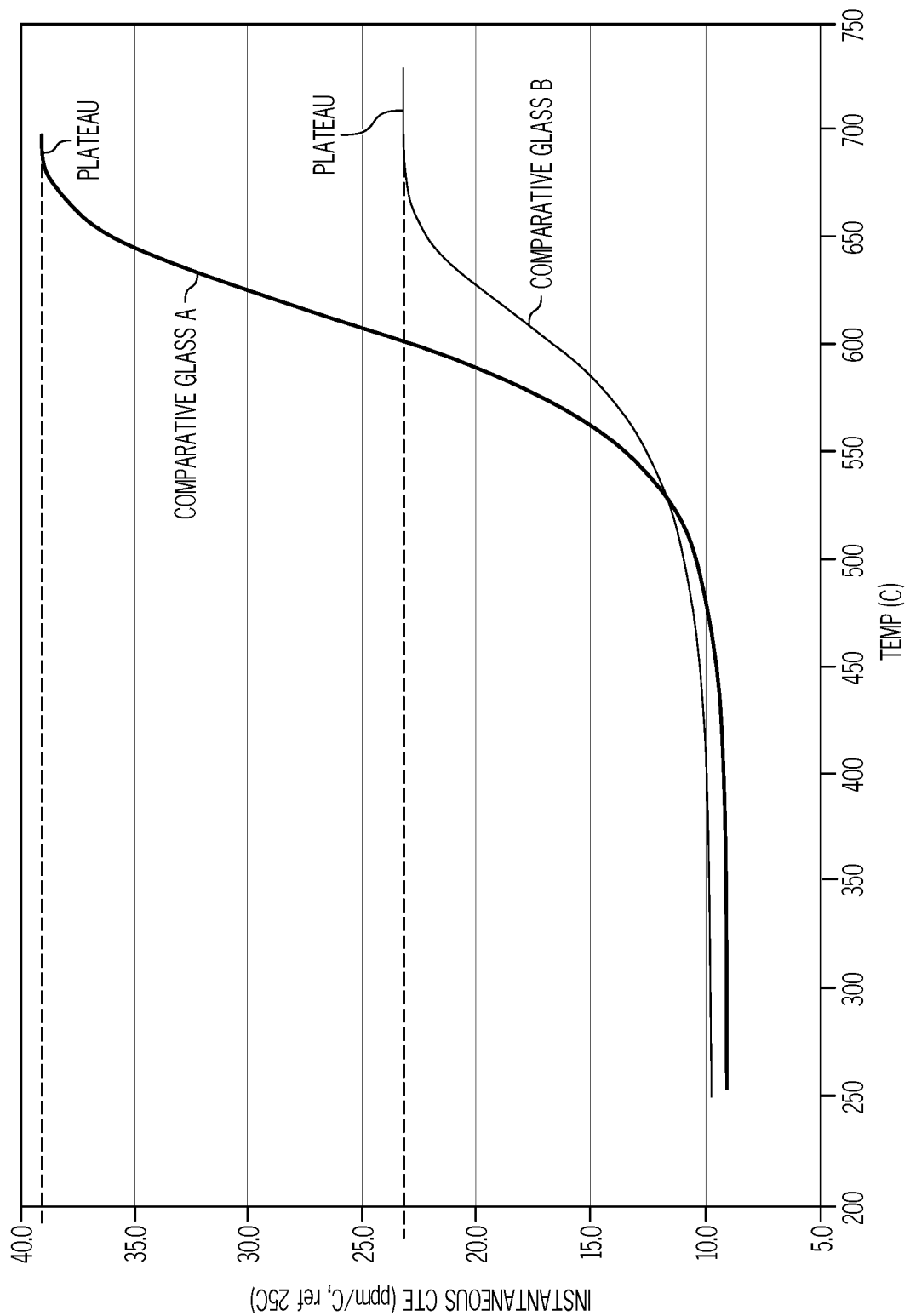
FIG. 1 graphically depicts the instantaneous CTE (y-axis) as a function of temperature (x-axis) for two comparative glass compositions.

Reference will now be made in detail to various embodiments of ion exchangeable glass compositions which are suitable for use with 3-D forming processes. The glass compositions described herein generally include $SiO_2$, $Al_2O_3$, $Li_2O$ and $Na_2O$. The glass composition may have softening points less than or equal to about 810° C. The glass composition may also have high temperature CTEs less than or equal to about $27\times10^{-6}/°$ C. The glass compositions may also be ion exchangeable such that the glass has a compressive stress greater than or equal to about 650 MPa and a depth of layer greater than or equal to about 25 μm after ion exchange in a salt bath comprising $KNO_3$ at about 410° C. for less than or equal to approximately 15 hours. Various embodiments of the glass compositions will be described in further detail herein with specific reference to the appended drawings.

The term "softening point," as used herein, refers to the temperature at which the viscosity of the glass composition is $1\times10^{7.6}$ poise.

The phrase "high temperature coefficient of thermal expansion" or "HT CTE," as used herein, refers to the coefficient of thermal expansion of the glass composition above the glass transition temperature of the glass composition. The HT CTE is determined by plotting the instantaneous CTE (y-axis) as a function of the temperature (x-axis). The HT CTE is the value of the HT CTE where the slope of the CTE v. temperature curve is approximately zero following a pronounced increase (i.e., where the CTE v. temperature curve "plateaus"). The value of the HT CTE is a measure of the volume change of the glass during cooling and is an indication of the dimensional stability of the glass composition when the glass is utilized in conjunction with elevated temperature 3-D forming process including, without limitation, vacuum sagging forming processes.

The term "liquidus viscosity," as used herein, refers to the shear viscosity of the glass composition at its liquidus temperature.

The term "liquidus temperature," as used herein, refers to the highest temperature at which devitrification occurs in the glass composition.

The term "substantially free," when used to described the absence of a particular oxide component in a glass composition, means that the component is present in the glass composition as a contaminant in a trace amount of less than about 0.05 mol. %.

In the embodiments of the glass compositions described herein, the concentration of constituent components (e.g., $SiO_2$, $Al_2O_3$, $B_2O_3$ and the like) are given in mole percent (mol. %) on an oxide basis, unless otherwise specified.

Conventional ion exchangeable glass compositions used as cover glasses in consumer electronic devices, generally have softening points of 840° C. or greater. Glasses with softening points in this range may be readily formed into planar sheets using fusion forming processes. However, such glass compositions are not always amenable to elevated temperature forming process. Specifically, the relatively high softening points of the glass compositions cause the glass compositions to react with the material of the mold such that the glass composition either sticks to the mold damaging the glass and/or degrading the mold, even when protective coatings are applied to the mold.

Further, attempts to improve the formability of ion exchangeable glass compositions by decreasing the softening points of the glass compositions have not been successful. Specifically, it has been found that glass compositions with lower softening points did not have the requisite dimensional stability for 3-D forming using elevated temperature processes such as vacuum sagging. Such glass compositions warp upon forming as the compositions are heated and/or cooled through the glass transformation region.

For example, FIG. 1 graphically depicts the instantaneous CTE (y-axis) as a function of temperature (x-axis) for two comparative glass compositions. Comparative glass A was a borosilicate glass which had a softening point of 752° C. and an HT CTE of approximately $39\times10^{-6}/°$ C. While not wishing to be bound by theory, it is believed that this relatively high HT CTE reduced the dimensional stability of the glass upon vacuum sagging, causing the glass to warp and distort. In contrast, Comparative glass B was an aluminosilicate glass which had a softening point of 837° C. and an HT CTE of approximately $23.2\times10^{-6}/°$ C. While this glass exhibited a relatively low HT CTE, it was found that the glass composition reacted with and/or stuck to the mold during vacuum sagging, inhibiting formation. While not wishing to be bound by theory, it is believed that the inability to consistently form Comparative glass B was due, at least in part, to the relatively higher softening point of the glass.

The glass compositions described herein address the deficiencies of previous glass compositions by providing glass compositions which have relatively low softening points, relatively low HT CTEs and have superior ion exchange performance relative to existing 3-D formable glass compositions.

In the embodiments described herein, the glass compositions have relatively low softening points of less than or equal to about 810° C. In some embodiments, the softening point of the glass composition may be less than or equal to about 800° C. or even less than or equal to about 790° C. In some other embodiments, the softening points may be less than about 750° C. The relatively low softening points of these glass compositions facilitate readily forming the glass compositions into 3-D shapes, such as glass articles with complex curvatures and the like, using vacuum sagging processes.

The glass compositions also have HT CTEs of less than or equal to about $27\times10^{-6}/°$ C. In some embodiments, the HT CTE of the glass composition may be less than or equal to about $25\times10^{-6}/°$ C. or even less than or equal to about $23 \times 10^{-6}/°$ C. As noted above, the HT CTE is an indication of the dimensional stability of the glass when the glass is utilized in conjunction with elevated temperature 3-D forming process including, without limitation, vacuum sagging processes. It has been determined that glasses which have HT CTEs greater than $27 \times 10^{-6}/°$ C. may warp during and/or after elevated temperature forming processes resulting in a glass article which may not conform to dimensional tolerances. However, it has also been determined that glasses with moderately lower HT CTEs, such as HT CTEs less than or equal to about $27 \times 10^{-6}/°$ C. are dimensionally stable during and following elevated temperature forming processes.

The glass compositions described herein are also amenable to strengthening by ion exchange processes. In the embodiments described herein, the glass compositions are able to achieve a depth of layer (DOL) of greater than or equal to about 25 μm. In some embodiments, the DOL may be greater than or equal to about 35 μm or even greater than or equal to about 45 μm. The compressive stress (CS) of the glass composition may be greater than or equal to about 600 MPa or even greater than or equal to about 650 MPa. Both the compressive stress and the DOL are determined following ion exchange strengthening in a salt bath comprising 100% $KNO_3$ or a salt bath comprising $KNO_3$ and $NaNO_3$ for less than or equal to approximately 15 hours at temperatures from about 390° C. to about 450° C.

In order to achieve the aforementioned properties, the glass compositions described herein generally include a combination of $SiO_2$, $Al_2O_3$, and alkali oxides such as $Li_2O$ and/or $Na_2O$. In some embodiments, the glass compositions may also include one or more divalent oxides, such as MgO, ZnO, CaO or the like. The glass compositions may also include $B_2O_3$. In some embodiments, the glass compositions may also comprise $K_2O$ in addition to $Li_2O$ and/or $Na_2O$. The glass compositions may additionally comprise $P_2O_5$. The glass compositions may also comprise one or more fining agents. The concentrations of these various constituent components used to achieve glass compositions having the aforementioned properties will be described in further detail herein.

As noted above the glass compositions described herein may include $B_2O_3$. In some embodiments, the concentration of $B_2O_3$ in the glass composition may be less than or equal to about 1.0 mol. % or even less than or equal to about 0.5 mol. %, including about 0 mol. % (i.e., glass compositions which are substantially free from $B_2O_3$). These glass compositions may be referred to herein as "low boron glass compositions." In other embodiments, the concentration of $B_2O_3$ may be greater than or equal to about 4.5 mol. %. These glass compositions may be referred to herein as "high boron glass compositions." However, it should be understood that the low boron glass compositions and the high boron glass compositions both exhibit the relatively low softening points, relatively low HT CTEs and ion exchangeability described above.

In the embodiments of the glass compositions described herein (i.e., both low boron glass compositions and high boron glass compositions), $SiO_2$ is the largest constituent of the composition and, as such, $SiO_2$ is the primary constituent of the glass network. When the concentration of $SiO_2$ in the glass composition is low (i.e., less than about 55 mol. %) the chemical durability of the resultant glass is low. In addition, the liquidus viscosity of the resultant glass may also be low rendering the glass unsuitable for fusion formation, such as with a fusion down draw process and/or a fusion lamination process. However, if the concentration of $SiO_2$ in the glass composition is too high (i.e., greater than about 75 mol. %), the formability of the glass composition may be diminished as higher concentrations of $SiO_2$ increase the difficulty of melting the glass which, in turn, adversely impacts the formability of the glass. In the embodiments described herein, the glass composition generally comprises $SiO_2$ in a concentration greater than or equal to about 55 mol. % and less than or equal to about 75 mol. % in order to facilitate a readily formable glass compositions.

In the low boron glass compositions, the concentration of $SiO_2$ may be greater than or equal to about 65 mol. % and less than or equal to about 71 mol %. In some embodiments, the concentration of $SiO_2$ may be greater than or equal to about 65.8 mol. % or even about 66 mol. % and less than or equal to about 71 mol. %. In some other embodiments, the concentration of $SiO_2$ in the glass composition may be greater than or equal to about 67 mol. % and less than or equal to about 71 mol. %. In some embodiments, the concentration of $SiO_2$ in the glass composition may be greater than or equal to about 68 mol. % and less than or equal to about 71 mol. %.

In the high boron glass compositions, the concentration of $SiO_2$ may be greater than or equal to about 55 mol. % and less than or equal to about 68 mol. %. In some of these embodiments, the concentration of $SiO_2$ in the glass composition may be greater than or equal to about 60 mol. % and less than or equal to about 65 mol. %.

The glass compositions described herein (i.e., both low boron glass compositions and high boron glass compositions) also comprise $Al_2O_3$. $Al_2O_3$ serves as a glass network former, similar to $SiO_2$. Like $SiO_2$, $Al_2O_3$ increases the viscosity of the glass composition due to its primarily tetrahedral coordination in a glass melt formed from the glass composition. $Al_2O_3$ improves the ion-exchange performance of the glass composition by increasing the strain point of the glass and increasing the diffusivity of alkali ions in the glass network. Accordingly, the presence of $Al_2O_3$ improves the kinetics of the ion-exchange process and increases the maximum compressive stress and DOL which can be obtained. In order to obtain the improvement in the kinetics of the ion-exchange process, the concentration of $Al_2O_3$ in the glass compositions is generally greater than or equal to about 7 mol. %.

In the embodiments of the low boron glass compositions described herein, the concentration of $Al_2O_3$ in the glass compositions is generally less than or equal to about 12 mol. % in order to achieve a glass composition which has a relatively low softening point. For example, in some embodiments, the concentration of $Al_2O_3$ in the glass compositions is greater than or equal to about 7 mol. % and less than or equal to about 12 mol. %. In some embodiments, the concentration of $Al_2O_3$ in the glass compositions may be greater than or equal to about 8 mol. % and less than or equal to about 12 mol. %. In some other embodiments, the concentration of $Al_2O_3$ may be greater than or equal to about 8 mol. % and less than or equal to about 11 mol. %.

In the embodiments of the high boron glass compositions described herein, the concentration of $Al_2O_3$ in the glass compositions is generally less than or equal to about 15 mol. % in order to achieve a glass composition which has a relatively low softening point. For example, in some embodiments, the concentration of $Al_2O_3$ in the glass compositions is greater than or equal to about 9 mol. % and less than or equal to about 15 mol. %. In some embodiments, the concentration of $Al_2O_3$ in the glass compositions may be greater than or equal to about 11 mol. % and less than or equal to about 14 mol. %.

The glass compositions described herein (i.e., both low boron glass boron glass compositions and high boron glass compositions) also include alkali oxide $R_2O$ where R is at least one of Li, Na, K or combinations thereof. The alkali oxides lower the melting temperature and the liquidus temperature of the glass, thereby improving the formability of the glass composition. Additions of $Li_2O$ generally decrease the softening point of the glass. The amount of $Li_2O$ in the glass composition can be adjusted to improve the reaction kinetics of the ion exchange process. Specifically, if a faster ion exchange process is desired, the concentration of $Li_2O$ in the glass compositions may be optionally decreased to less than about 5 mol. %, such as from greater than or equal to about 1 mol. % to less than or equal to about 5 mol. %, or even from greater than or equal to about 2 mol. % to less than or equal to about 5 mol. %, in order to increase the ion exchange rate while also decreasing the softening point of the glass.

In the embodiments of the low boron glass compositions described herein, $Li_2O$ is generally added to the glass compositions to decrease the softening point of the glass. The concentration of $Li_2O$ in the glass compositions is generally greater than or equal to about 1 mol. % in order to achieve a glass composition which has a relatively low softening point. For example, in some embodiments, the concentration of $Li_2O$ in the glass compositions is greater than or equal to about 1 mol. % and less than or equal to about 9 mol. %. In some embodiments, the concentration of $Li_2O$ in the glass compositions may be greater than or equal to about 1 mol. % and less than or equal to about 7 mol. %. In embodiments where a faster ion exchange time is desired for a given temperature, the concentration of $Li_2O$ may be greater than or equal to about 1 mol. % and less than or equal to about 5 mol. %, or even greater than or equal to about 2 mol. % and less than or equal to about 5 mol. %. In some other embodiments, the concentration of $Li_2O$ may be greater than or equal to about 2 mol. % and less than or equal to about 3.5 mol. %.

In the embodiments of the high boron glass compositions described herein, the concentration of $Li_2O$ in the glass compositions is generally greater than or equal to about 1 mol. % in order to achieve a glass composition which has a relatively low softening point. For example, in some embodiments, the concentration of $Li_2O$ in the glass compositions is greater than or equal to about 1 mol. % and less than or equal to about 7 mol. %. In embodiments where a faster ion exchange time is desired for a given temperature, the concentration of $Li_2O$ may be greater than or equal to about 1 mol. % and less than or equal to about 5 mol. %, or even greater than or equal to about 2 mol. % and less than or equal to about 5 mol. %.

Additions of $Na_2O$ in the glass compositions facilitate ion exchange strengthening the glass compositions. Specifically, the smaller $Na^+$ ions in the resultant glass network can be exchanged for larger $K^+$ ions in the ion exchange salt bath. If the $Na_2O$ concentration in the glass composition is too low, the resultant depth of layer after ion exchange is too low. However, if the $Na_2O$ concentration in the glass composition in too high, the HT CTE of the glass composition increases. In the embodiments described herein, the $Na_2O$ is present in the glass compositions in an amount from about 3 mol. % to about 16 mol. %.

In the embodiments of the low boron glass compositions described herein, the concentration of $Na_2O$ in the glass compositions is generally less than or equal to about 16 mol. % in order to maintain a relatively low HT CTE. For example, in some embodiments, the concentration of $Na_2O$ in the glass compositions is greater than or equal to about 6 mol. % and less than or equal to about 16 mol. %. In some embodiments, the concentration of $Na_2O$ in the glass compositions may be greater than or equal to about 8 mol. % and less than or equal to about 16 mol. %. In some other embodiments, the concentration of $Na_2O$ in the glass compositions may be greater than or equal to about 10 mol. % and less than or equal to about 16 mol. %. In still other embodiments, the concentration of $Na_2O$ in the glass compositions may be greater than or equal to about 12 mol. % and less than or equal to about 15 mol. %.

In the embodiments of the high boron glass compositions described herein, the concentration of $Na_2O$ in the glass compositions is generally less than or equal to about 12 mol. % in order to maintain a low alkali to alumina ratio and resultant relatively low HT CTE. For example, in some embodiments, the concentration of $Na_2O$ in the glass compositions is greater than or equal to about 3 mol. % and less than or equal to about 12 mol. %. In some embodiments, the concentration of $Na_2O$ in the glass compositions may be greater than or equal to about 8 mol. % and less than or equal to about 12 mol. %.

In some embodiments, the glass compositions described herein may optionally include the alkali oxide $K_2O$. $K_2O$ is generally added to the glass compositions to improve ion exchange performance. Specifically, $K_2O$ may be added to the glass compositions in order to achieve the desired compressive stress and DOL. In the embodiments described herein, $K_2O$, when included, is present in the glass compositions in an amount less than or equal to about 3.0 mol. %.

In the embodiments of the low boron glass compositions described herein, the concentration of $K_2O$ in the glass compositions is generally greater than or equal to about 0 mol. %. For example, in some embodiments, the concentration of $K_2O$ in the glass compositions is greater than or equal to about 0 mol. % and less than or equal to about 5 mol. %. In some embodiments, the concentration of $K_2O$ in the glass compositions may be greater than or equal to about 0 mol. % and less than or equal to about 3 mol. %. In some other embodiments, the concentration of $K_2O$ in the glass compositions may be greater than or equal to about 0 mol. % and less than or equal to about 2 mol. %. In some other embodiments, the concentration of $K_2O$ in the glass compositions may be less than or equal to about 1 mol. % or even less than or equal to about 0.5 mol. %. In some embodiments, the low boron glass compositions are substantially free of $K_2O$.

In the embodiments of the high boron glass compositions described herein, the concentration of $K_2O$ in the glass compositions is generally greater than or equal to about 0 mol. %. For example, in some embodiments, the concentration of $K_2O$ in the glass compositions is greater than or equal to about 0 mol. % and less than or equal to about 3 mol. %. In some embodiments, the concentration of $K_2O$ in the glass compositions may be greater than or equal to about 0 mol. % and less than or equal to about 2 mol. %. In some other embodiments, the concentration of $K_2O$ in the glass compositions may be less than or equal to about 1 mol. % or even less than or equal to about 0.5 mol. %. In some embodiments, the high boron glass compositions are substantially free of $K_2O$.

Further, in the embodiments of the high boron glass composition described herein, the ratio of $R_2O$ to the concentration of $Al_2O_3$ is generally less than or equal to about 1.15 or even 1.1, where $R_2O$ is the sum of the concentrations of $Na_2O$, $Li_2O$ and $K_2O$. In some of these embodiments, the ratio of $R_2O$ to the concentration of $Al_2O_3$ is generally greater than or equal to about 0.9. In some embodiments, the ratio $R_2O:Al_2O_3$ is less than or equal to about 1.1 and greater than or equal to about 0.9. In some embodiments, the ratio $R_2O:Al_2O_3$ is less than or equal to about 1.1 and greater than or equal to about 1.0. In some other embodiments, the HT CTE is less than or equal to about 1.0 and greater than or equal to 0.9. Maintaining the ratio $R_2O:Al_2O_3$ at less than about 1.15 or even 1.1 in high boron glass composition generally lowers the HT CTE to less than or equal to about 27×10–6/° C. In particular, in the embodiments of the glass compositions described herein, the sum of the concentration of alkali oxide constituents is balanced against the concentration of $Al_2O_3$. This balance produces several desirable characteristics in the resulting glass. Specifically, $Al_2O_3$ utilizes alkali metals, such as the potassium, lithium and sodium, for charge stabilization. If excess alkali is present in the glass composition (i.e., $R_2O:Al_2O_3$ is greater than or equal to 1.15 or even 1.1), the excess alkali in the glass composition interacts with the boron in the glass composition and converts the boron from its standard trigonal (threefold-coordinated) configuration into a tetrahedral (fourfold-coordinated) configuration. The change in the coordination of the boron from trigonal to tetrahedral increases the HT CTE of the glass. Accordingly, by maintaining the ratio of $R_2O$ to $Al_2O_3$ at less than or equal to about 1.15 or even less than or equal to about 1.1 prevents the boron in the glass from assuming a tetrahedral coordination in the glass and thereby promotes a relatively low HT CTE.

In some embodiments described herein, the glass compositions may include $B_2O_3$. Like $SiO_2$ and $Al_2O_3$, $B_2O_3$ contributes to the formation of the glass network. Conventionally, $B_2O_3$ is added to a glass composition in order to decrease the viscosity of the glass composition. In general, $B_2O_3$ acts as a flux which may be utilized to form glass compositions with low softening points. However, the presence of $B_2O_3$ significantly increases the HT CTE when excess alkali oxides are present which are not associated with $Al_2O_3$. However, if the concentration of alkali oxides is balanced against the concentration of $Al_2O_3$, higher concentrations of boron oxide do not significantly impact the HT CTE of the glass composition. Accordingly, the glass compositions described herein may contain a low concentration of $B_2O_3$ (i.e., the "low boron glass compositions") or a high concentration of $B_2O_3$ (i.e., the "high boron glass compositions") in order to achieve a glass composition having the desired properties.

In the low boron glass compositions, $B_2O_3$ is generally present in the glass compositions in an amount less than or equal to about 1 mol. % in order to minimize the increase in HT CTE by limiting the interaction between $B_2O_3$ and excess alkali oxides. For example, in some embodiments, $B_2O_3$ is present in the glass compositions in a concentration greater than or equal to about 0 mol. % and less than or equal to about 1 mol. %. In other embodiments described herein, $B_2O_3$ is present in the glass compositions in a concentration of less than about 0.5 mol. %. For example, in some embodiments, the concentration of $B_2O_3$ in the glass composition is greater than or equal to about 0 mol. % and less than or equal to about 0.5 mol. %, or even less than or equal to about 0.4 mol. %.

In the high boron glass compositions, $B_2O_3$ is generally present in the glass compositions in an amount greater than or equal to about 4.5 mol. %. In these embodiments, the impact of $B_2O_3$ on the HT CTE is mitigated by controlling the ratio $R_2O:Al_2O_3$, as described above. For example, in some embodiments, $B_2O_3$ is present in the glass compositions in a concentration greater than or equal to about 4.5 mol. % or even 5 mol. % and less than or equal to about 12 mol. %. In other embodiments described herein, the concentration of $B_2O_3$ in the glass composition is greater than or equal to about 7 mol. % and less than or equal to about 12 mol. %, or even greater than or equal to about 9 mol. % and less than or equal to about 12 mol. %.

The glass compositions described herein may further include one or more divalent oxides MO, where M is an alkaline earth metal (such as Mg or Ca) and/or Zn. The divalent oxides improve the melting behavior of the glass compositions. Additions of MgO and ZnO also improve the ion exchange performance of the glass composition. In particular, it has been found that additions of MgO and ZnO generally increase the compressive stress and DOL for a given ion exchange condition (time and temperature) without increasing the softening point of the glass composition. Additions of CaO to the glass composition generally assist in maintaining a sufficient DOL of the compressive stress following ion exchange strengthening.

In the low boron glass compositions described herein, the glass compositions include at least one of MgO and ZnO and the total concentration of divalent oxide is greater than or equal to about 0.8 mol. % or even 1 mol. % and less than or equal to about 10 mol. %. Moreover, in the low boron glass compositions described herein, the sum of the concentration of $Al_2O_3$ (mol. %) and the concentration of the divalent oxide (mol. %) is generally greater than or equal to about 10 mol. % which generally improves the ion exchange performance of the glass.

In the low boron glass compositions described herein, MgO may be present in a concentration from about 0 mol. % to about 7 mol. %. For example, in some embodiments, the concentration of MgO may be greater than or equal to about 3 mol. % and less than or equal to about 5 mol. %. In some other embodiments, the concentration of MgO may be greater than or equal to about 2 mol. % and less than or equal to about 4 mol. %.

Further, in the low boron glasses described herein, CaO may be present in a concentration greater than or equal to about 0 mol. % and less than or equal to about 1 mol. %. For example, in some embodiments, the concentration of CaO may be greater than or equal to about 0 mol. % and less than or equal to about 0.5 mol. %.

In the low boron glass compositions described herein, ZnO may be present in a concentration from about 0 mol. % to about 6 mol. %. For example, in some embodiments, the concentration of ZnO may be greater than or equal to about 2 mol. % and less than or equal to about 4 mol. %.

The high boron glass compositions described herein may also include one or more divalent oxides MO. For example, in some embodiments of the high boron glass compositions which include MgO, the MgO may be present in a concentration greater than or equal to about 0 mol. % and less than or equal to about 5 mol. %. In some embodiments of the high boron glass compositions which include ZnO, the ZnO may be present in a concentration greater than or equal to about 0 mol. % and less than or equal to about 5 mol. %. In some embodiments of the high boron glass compositions which include CaO, the CaO may be present in a concentration greater than or equal to about 0 mol. % and less than or equal to about 2 mol. %.

The glass compositions described herein (i.e. both low boron glass compositions and high boron glass compositions) may also include $P_2O_5$. Additions of $P_2O_5$ increase the speed of ion exchange at a given temperature such that an equivalent depth of layer may be reached in a shorter time period. In some embodiments of the glass compositions described herein, $P_2O_5$ may be present in the glass compositions in a concentration greater than or equal to about 0 mol. % and less than or equal to about 3 mol. %. In some embodiments, the concentration of $P_2O_5$ may be greater than or equal to about 0 mol. % and less than or equal to about 2 mol. %. In some other embodiments, the concentration of $P_2O_5$ may be greater than or equal to about 0.5 mol. % and less than or equal to about 1.0 mol. %.

The glass compositions described herein may optionally include one or more fining agents. The fining agents may include, for example, $SnO_2$, $Sb_2O_3$, $As_2O_3$, NaCl, $(Al)OH_3$, and $CeO_2$, and combinations thereof. The fining agents may be present in the glass compositions in an amount greater than or equal to about 0 mol. % and less than or equal to about 1.0 mol. %. In exemplary embodiments, the fining agent is $SnO_2$. The $SnO_2$ may be present in the glass composition in a concentration greater than or equal to about 0 mol. % and less than or equal to about 1.0 mol. %. In some of these embodiments, $SnO_2$ may be present in the glass composition in a concentration which is greater than or equal to about 0 mol. % and less than or equal to about 0.5 mol. % or even less than or equal to about 0.3 mol. %.

In some embodiments of the low boron glass compositions described herein, the glass compositions may optionally comprise zirconia ($ZrO_2$). Additions of zirconia improve the ion exchange performance of the glass composition by increasing the depth of layer which may be achieved. However, if the amount of zirconia exceeds about 3 mol. %, the liquidus viscosity of the glass composition decreases, making the glass composition difficult to form. Accordingly, in the embodiments of the glass compositions which contain zirconia, the glass compositions may include greater than or equal to about 0.5 mol. % and less than or equal to about 2 mol. % $ZrO_2$. In some of these embodiments, the low boron glass compositions may include greater than or equal to about 1.0 mol. % and less than or equal to about 1.5 mol. % $ZrO_2$. In some of these embodiments, the concentration of $ZrO_2$ in the low boron glass compositions is about 1 mol. %. However, it should be understood that, in some embodiments of the low boron glass compositions described herein, the glass compositions are substantially free of zirconia ($ZrO_2$).

Certain applications of the glass compositions described herein may require that the glass be opaque and have a certain color, such as black. Accordingly, in the embodiments of the high boron glass compositions described herein, the glass compositions may include one or more constituents which act as a colorant. For example, some of the high boron glass compositions may include $Fe_2O_3$ and $TiO_2$ which, in combination, may be used to impart a black color and opacity to glass formed from the glass compositions. In these embodiments, $Fe_2O_3$ and $TiO_2$ may be present in the glass composition such that a ratio of $Fe_2O_3$ (mol. %) to $TiO_2$ (mol. %) is in a range from greater than or equal to about 0.52 to less than or equal to about 1.22. In some embodiments, the ratio of $Fe_2O_3$ (mol. %) to $TiO_2$ (mol. %) may be in a range from greater than or equal to about 0.60 to less than or equal to about 1.00. As the ratio of $Fe_2O_3$ to $TiO_2$ decreases, the resultant glass article becomes less black as determined from the CIE F2 Illuminant and the L, a*, b* scale. In one particular embodiment, the total concentration of $Fe_2O_3$ and $TiO_2$ (i.e., $Fe_2O_3$ (mol. %)+$TiO_2$ (mol. %)) is approximately 1.75 mol. %. However, it should be understood that other total concentrations of $Fe_2O_3$ and $TiO_2$ may also be utilized including total concentrations greater than 1.75 mol. % and total concentrations less than 1.75 mol. %.

In some embodiments described herein, a black color is achieved in the resultant glass formed from a glass composition containing color modifying constituents by thermally treating the glass article. For example, in one embodiment, the glass may be initially annealed at a temperature in the range from about 560° C. to about 575° C. for a time period of less than or equal to approximately 1 hour and subsequently cooled. Thereafter, the glass may be heat treated at a temperature from about 600° C. to about 650° C. for less than or equal to approximately 10 hours, after which the glass is opaque and has a black color. While not wishing to be bound by theory, it is believed that the black color is a result of precipitates formed from a combination of $Fe_2O_3$ and $TiO_2$ (such as pseudo-brookite or the like) which precipitate in the glass during thermal treatment.

In some embodiments, when the high boron glass composition includes color modifying constituents such as those described above, the black color following thermal treatment occurs when the alkali to alumina ratio ($R_2O:Al_2O_3$) is less than or equal to about 1.15 or even less than or equal to about 1.12. In some embodiments, the black color may be obtained when the alkali to alumina ratio ($R_2O:Al_2O_3$) is greater than or equal to about 0.98 or even 1.02. For example, in some embodiments, the black color may be obtained when the alkali to alumina ratio is less than or equal to about 1.15 and greater than about 0.98. In some embodiments, the black color is obtained when the alkali to alumina ratio is less than or equal to about 1.12 and greater than or equal to about 1.02. In some other embodiments, the black color is obtained when the alkali to alumina ratio less than or equal to about 1.1 and greater than or equal to about 1.04.

In the embodiments of the high boron glass compositions which include color modifying constituents, the resultant glass may be opaque. The degree of opacity may be determined by the light absorption of the glass as measured by spectral photometry. In the embodiments described herein, the degree of opacity was measured by an X-Rite CI7 Spectro-Photometer. In the exemplary embodiments of the high boron glass with color modifying agents described herein, the resultant opaque glass may have an opacity (i.e., a light absorption) greater than or equal to about 80% over a range of wavelengths from about 350 nm to about 750 nm incident on the glass article. This means that less than about 20% of the light incident on the glass article is actually transmitted through the glass article. In some embodiments, the opacity may be greater than or equal to about 80% and less than or equal to 100% over a range of wavelengths from about 350 nm to about 750 nm. In some other embodiments, the opacity may be about 100% over a range of wavelengths from about 350 nm to about 750 nm.

As noted herein, color modifying agents added to the high boron glass compositions may result in a glass which is black in color. The degree of color may be quantified according using the CIE F2 Illuminant and the L, a*, b* scale. For example, in some embodiments, the glass article has L, a*, b*, color coordinates in which L from about 0 to about 5.0; a* from about −2.0 to about 2.0; and b* from about 0 to about −5.0. Glass with color coordinates within these ranges generally has a deep black color.

In addition, it has been found that the high boron glass compositions which contain color modifying constituents as described herein are readily amenable to strengthening by ion exchange. The depth of layer of these glass compositions may be greater than or equal to about 25 μm. In some embodiments, the DOL may be greater than or equal to about 35 μm or even greater than or equal to about 45 μm. It is believed that the compressive stress imparted to these glass compositions by ion exchange may be at least equal to or even greater than the same glass composition without color modifying agents. However, measurement of the compressive stress using conventional techniques (such as stress birefringence) is complicated due to the optical properties of the glass (opacity and black color). Accordingly, the characteristic strength of the glass article may be used as an estimate of the compressive stress imparted to the glass. Specifically, ring-on-ring testing of a plurality of un-abraded glass plate samples formed from the glass composition may be tested using the methodology described in ASTM Standard C1499 entitled "Standard Test Method for Monotonic Equibiaxial Flexural Strength of Advanced Ceramics at Ambient Temperature." From this data a Weibull distribution of the strength at failure may be constructed and the characteristic strength and Weibull modulus may be determined. In the exemplary embodiments described herein, a glass plate formed from the high boron glass composition containing color modifying agents with a thickness of approximately 0.8 mm generally has a characteristic strength greater than or equal to about 1500 MPa or even about 1600 MPa following an anneal treatment at about 570° C. for approximately 2 hours, a heat treatment at about 640° C. for approximately 4 hours and an ion exchange treatment at about 440° C. for approximately 15 hours in a salt bath of 100% $KNO_3$. In some embodiments, the characteristic strength may be greater than or equal to about 1700 MPa or even about 1800 MPa after the same treatments. In some other embodiments the characteristic strength may be greater than or equal to about 1900 MPa after the same treatments. In the embodiments described herein, a glass plate formed from the high boron glass composition containing color modifying agents with a thickness of approximately 0.8 mm generally has a Weibull modulus greater than or equal to about 8 or even about 9 following an anneal treatment at about 570° C. for approximately 2 hours, a heat treatment at about 640° C. for approximately 4 hours and an ion exchange treatment at about 440° C. for approximately 15 hours in a salt bath of 100% $KNO_3$. In embodiments, the Weibull modulus may be greater than or equal to about 10 or even about 11 after the same treatments. The Weibull modulus is the slope of the Weibull plot and is generally indicative of sensitivity of the material to failure due to flaws. In embodiments the characteristic strength may be greater than or equal to about 13 after the same treatments. The characteristic strength is indicative of the strength at 63.2% the failure probability as determined by the Weibull distribution.

In addition to the relatively low softening points, HT CTEs, and ion exchange properties described above, the glass compositions described herein also exhibit properties which make the glass compositions suitable for use in fusion forming processes, such as the fusion down draw process. Specifically, the glass compositions described herein have liquid temperatures of less than about 1000° C. and liquidus viscosities of greater than about 150 kP. Moreover, the glass compositions also have zircon breakdown viscosities of less than about 35 kP such that the glass compositions are compatible with fusion forming utilizing zirconia isopipes. Further, the glass compositions described herein also exhibit a viscosity of less than about 200 P at melting temperatures in the range from about 1500° C. to about 1650° C. and viscosities of about 35 kP at forming temperatures from about 1050° C. to about 1150° C.

Based on the foregoing, it should be understood that various embodiments of glass compositions with relatively low softening points and relatively low high temperature coefficients of thermal expansion are disclosed herein. In a first exemplary embodiment, a glass composition includes $SiO_2$, $Al_2O_3$, $Li_2O$ and $Na_2O$. The glass composition may generally have a softening point less than or equal to about 810° C. and a high temperature CTE less than or equal to about $27 \times 10^{-6}/°$ C. The glass composition may have a compressive stress greater than or equal to about 650 MPa and a depth of layer greater than or equal to about 25 μm after ion exchange in a salt bath comprising $KNO_3$ at about 410° C. for less than or equal to approximately 15 hours.

In a second exemplary embodiment, a glass composition includes from about from about 65 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; from about 0 mol. % to about 5 mol. % $K_2O$; from about 0.8 to about 10 mol. % of a divalent oxide, wherein the divalent oxide comprises at least one of MgO and ZnO; and less than about 0.5 mol. % $B_2O_3$, wherein a sum of the concentration of $Al_2O_3$ (mol. %), and a concentration of the divalent oxide (mol. %) is greater than about 10 mol %. In this second exemplary embodiment, the glass composition may optionally include from about 0.5 mol. % to about 2 mol. % $ZrO_2$. Alternatively, this second exemplary composition may be substantially free of $ZrO_2$. When the second exemplary compositions is substantially free of $ZrO_2$, the glass composition may comprise from about 65.8 mol. % to about 71 mol. % $SiO_2$. The glass composition may generally have a softening point less than or equal to about 810° C. and a high temperature CTE less than or equal to about $27 \times 10^{-6}/°$ C. The glass composition may have a compressive stress greater than or equal to about 650 MPa and a depth of layer greater than or equal to about 25 μm after ion exchange in a salt bath comprising $KNO_3$ at about 410° C. for less than or equal to approximately 15 hours.

In a third exemplary embodiment, a glass composition includes from about from about 55 mol. % to about 68 mol. % $SiO_2$; from about 9 mol. % to about 15 mol. % $Al_2O_3$; from about 4.5 mol % to about 12 mol. % $B_2O_3$; from about 1 mol. % to about 7 mol. % $Li_2O$; from about 3 mol. % to about 12 mol. % $Na_2O$; and from about 0 mol. % to about 3 mol % $K_2O$. In this embodiment, $R_2O$ is the sum of the concentration of $Li_2O$, the concentration of $Na_2O$, and the concentration of $K_2O$, and the ratio of $R_2O$ to the concentration of $Al_2O_3$ is less than or equal to about 1.1. The glass composition may generally have a softening point less than or equal to about 810° C. and a high temperature CTE less than or equal to about $27 \times 10^{-6}/°$ C. The glass composition may have a compressive stress greater than or equal to about 650 MPa and a depth of layer greater than or equal to about 25 μm after ion exchange in a salt bath comprising $KNO_3$ at about 410° C. for less than or equal to approximately 15 hours.

In a fourth exemplary embodiment, a glass composition includes from about 65.8 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; from about 1 mol. % to about 10 mol. % of a divalent oxide, wherein the divalent oxide is at least one of MgO and ZnO; and less than about 0.5 mol. % $B_2O_3$. The sum of the concentration of $Al_2O_3$ (mol. %), and a concentration of the divalent oxide (mol. %) is greater than about 10 mol %. The glass composition may generally have a softening point less than or equal to about 810° C. and a high temperature CTE less than or equal to about $27 \times 10^{-6}/°$ C. In this embodiment, the glass composition may be substantially free of $ZrO_2$.

In a fifth exemplary embodiment, a glass composition includes from about 65.8 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; and from about 1 mol. % to about 10 mol. % of a divalent oxide, wherein the divalent oxide is at least one of MgO and ZnO. The glass composition is substantially free from $ZrO_2$ and $B_2O_3$. The sum of the concentration of $Al_2O_3$ (mol. %), and the concentration of the divalent oxide (mol. %) is greater than 10 mol %. The glass composition may generally have a softening point less than or equal to about 810° C. and a high temperature CTE less than or equal to about $27 \times 10^{-6}$/° C.

In a sixth exemplary embodiment, a glass composition includes from about 67 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; and from about 1 mol. % to about 10 mol. % of a divalent oxide, wherein the divalent oxide is at least one of MgO and ZnO. The glass composition may also include from about 0 mol. % to about 7 mol. % MgO; from about 0 mol. % to about 1 mol. % CaO; and from about 0 mol. % to about 6 mol. % ZnO. The glass composition is substantially free from $B_2O_3$. The sum of the concentration of $Al_2O_3$ (mol. %), and the concentration of the divalent oxide (mol. %) is greater than about 10 mol %. The glass composition may generally have a softening point less than or equal to about 810° C. and a high temperature CTE less than or equal to about $27 \times 10^{-6}$/° C.

In a seventh exemplary embodiment, a glass composition includes from about from about 55 mol. % to about 68 mol. % $SiO_2$; from about 9 mol. % to about 15 mol. % $Al_2O_3$; from about 4.5 mol % to about 12 mol. % $B_2O_3$; from about 1 mol. % to about 7 mol. % $Li_2O$; from about 3 mol. % to about 12 mol. % $Na_2O$; and from about 0 mol. % to about 3 mol % $K_2O$. In this embodiment, $R_2O$ is the sum of the concentration of $Li_2O$, the concentration of $Na_2O$, and the concentration of $K_2O$, and the ratio of $R_2O$ to the concentration of $Al_2O_3$ is less than or equal to about 1.1. The glass composition may generally have a softening point less than or equal to about 810° C. and a high temperature CTE less than or equal to about $27 \times 10^{-6}$/° C.

In an eighth exemplary embodiment, a glass composition includes from about 55 mol. % to about 68 mol. % $SiO_2$; from about 9 mol. % to about 15 mol. % $Al_2O_3$; from about 4.5 mol % to about 12 mol. % $B_2O_3$; from about 1 mol. % to about 7 mol. % $Li_2O$; from about 3 mol. % to about 12 mol. % $Na_2O$; and from about 0 mol. % to about 3 mol % $K_2O$. In this embodiment, $R_2O$ is the sum of the concentration of $Li_2O$, the concentration of $Na_2O$, and the concentration of $K_2O$, and the ratio of $R_2O$ to the concentration of $Al_2O_3$ is less than or equal to about 1.1. The glass composition may generally have a softening point less than or equal to about 810° C. and a high temperature CTE less than or equal to about $27 \times 10^{-6}$/° C.

In a ninth exemplary embodiment, a glass composition includes from about 55 mol. % to about 68 mol. % $SiO_2$; from about 9 mol. % to about 15 mol. % $Al_2O_3$; from about 4.5 mol % to about 12 mol. % $B_2O_3$; from about 1 mol. % to about 7 mol. % $Li_2O$; from about 3 mol. % to about 12 mol. % $Na_2O$; and from about 0 mol. % to about 3 mol % $K_2O$. The glass composition may further include from about 0 mol. % to about 5 mol. % MgO; from about 0 mol. % to about 5 mol. % ZnO; and from about 0 mol. % to about 2 mol. % CaO. In this embodiment, $R_2O$ is the sum of the concentration of $Li_2O$, the concentration of $Na_2O$, and the concentration of $K_2O$ and the ratio of $R_2O$ to the concentration of $Al_2O_3$ is less than or equal to about 1.1. The glass composition may generally have a softening point less than or equal to about 810° C. and a high temperature CTE less than or equal to about $27 \times 10^{-6}$/° C.

In a tenth exemplary embodiment, a glass composition includes from about 65 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; from about 0 mol. % to about 5 mol. % $K_2O$; from about 0.8 to about 10 mol. % of a divalent oxide, wherein the divalent oxide comprises at least one of MgO and ZnO; from about 0.5 mol. % to about 2 mol. % $ZrO_2$; and less than about 0.5 mol. % $B_2O_3$. In this exemplary embodiment, the sum of the concentration of $Al_2O_3$ (mol. %), and the concentration of the divalent oxide (mol. %) is greater than 10 mol %. The glass composition has a softening point less than or equal to about 810° C. The glass composition has a high temperature CTE less than or equal to about $27 \times 10^{-6}$/° C.

Examples

The embodiments of the glass compositions described herein will be further clarified by the following examples.

A plurality of exemplary glass compositions were prepared according to the batch compositions listed in Tables 1-6 below. Batches of the oxide constituent components were mixed, melted and formed into glass. The properties of the glass composition (i.e., softening point, HT CTE, etc.) were measured and the results are reported in Tables 1-6. Comparative Examples (i.e., non-inventive Examples) are prefaced with a "C" in the example identification.

Figure 2:
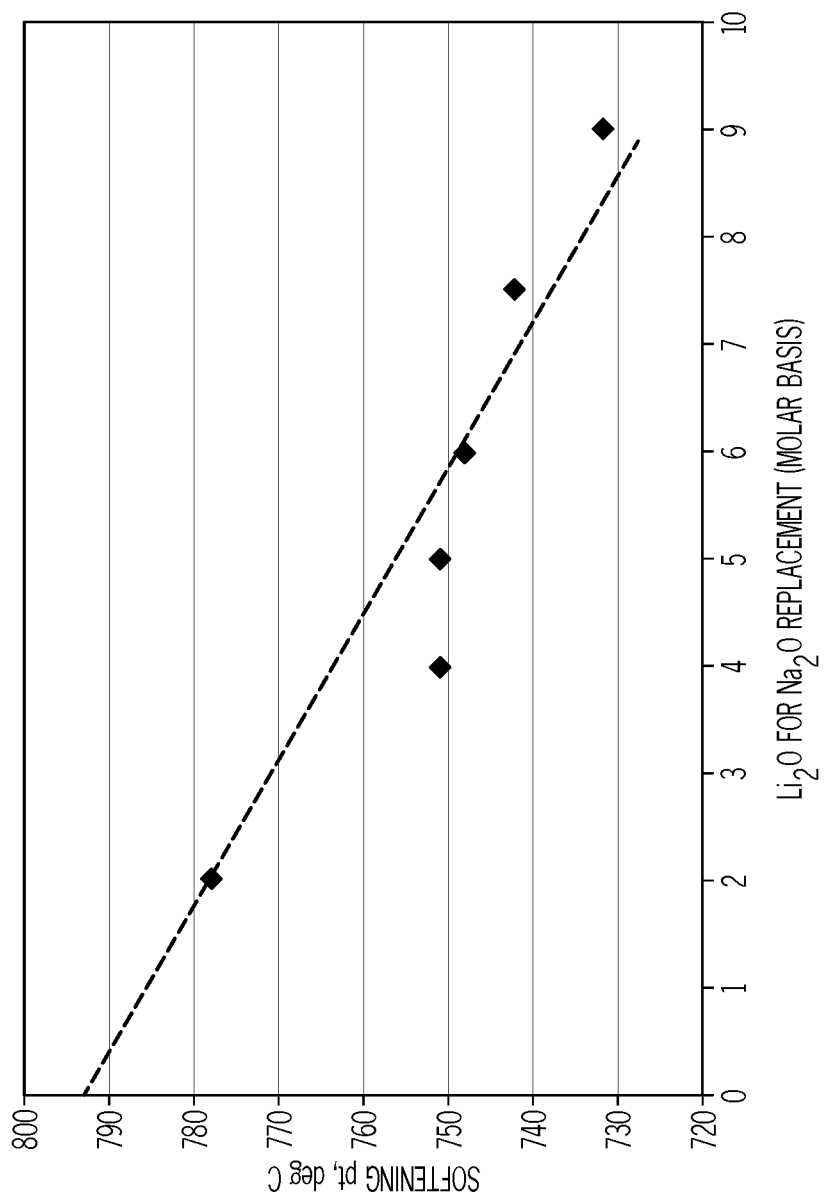
FIG. 2 graphically depicts the softening point (y-axis) as a function of the concentration of $Li_2O$ (x-axis) as $Li_2O$ is substituted for $Na_2O$ in an exemplary glass composition.
Figure 3:
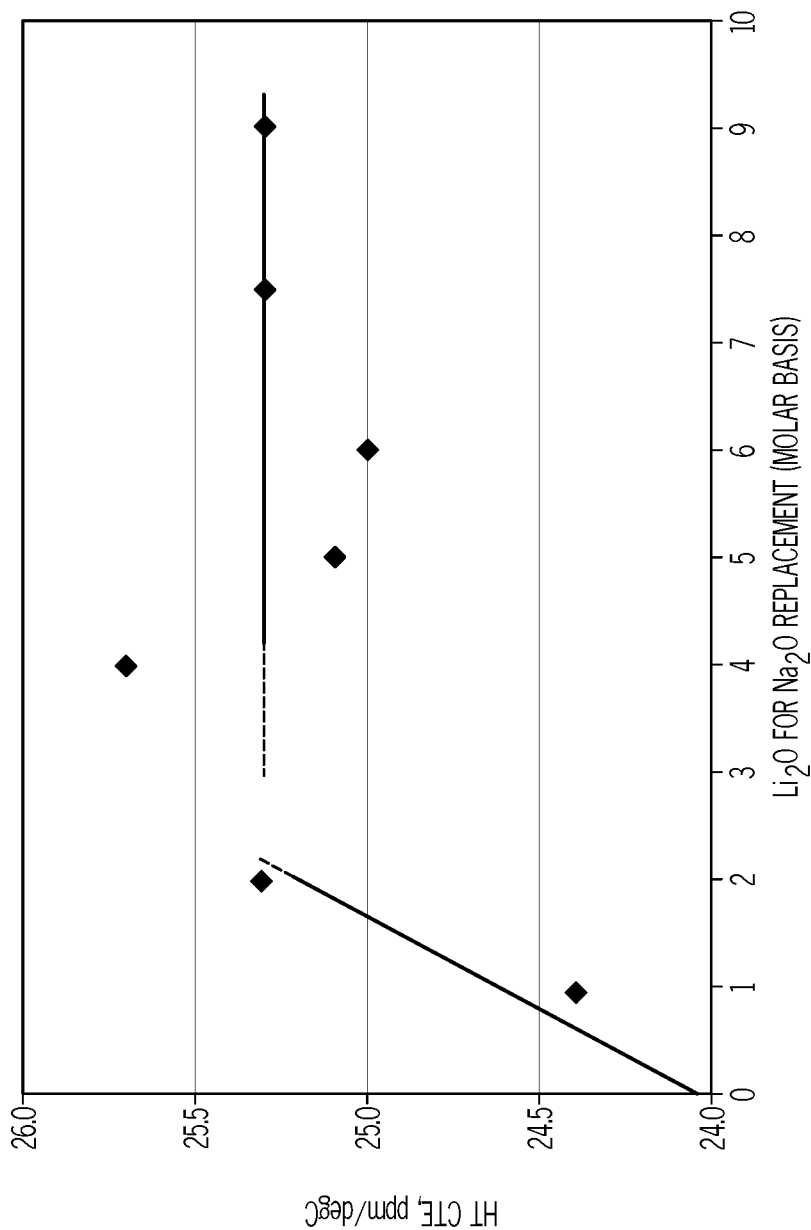
FIG. 3 graphically depicts the HT CTE (y-axis) as a function of the concentration of $Li_2O$ (x-axis) as $Li_2O$ is substituted for $Na_2O$ in an exemplary glass composition.

Referring now to Table 1, seven exemplary low boron glass compositions were prepared to investigate the effect of substituting $Li_2O$ for $Na_2O$ on softening point and HT CTE. FIG. 2 graphically depicts the softening point (y-axis) as a function of the concentration of $Li_2O$ (x-axis) as $Li_2O$ is substituted for $Na_2O$. FIG. 3 graphically depicts the HT CTE (y-axis) as a function of the concentration of $Li_2O$ (x-axis) as $Li_2O$ is substituted for $Na_2O$.

As indicated by the data in Table 1 and FIGS. 2 and 3, the partial substitution of $Li_2O$ for $Na_2O$ resulted in a progressive decrease in the softening point of the glass composition. In particular, substitution of 9 mol. % $Li_2O$ for $Na_2O$ decreased the softening point by up to 70° C. The substitution of $Li_2O$ for $Na_2O$ also caused a slight increase in the HT CTE (from $24 \times 10^{-6}$/° C. to $25.5 \times 10^{-6}$/° C. for a 1-3 mol. % substitution). However, even after the substitution, the HT CTE values of these compositions were less than $27 \times 10^{-6}$/° C. Moreover, as graphically depicted in FIG. 3, the data from Table 1 indicates that the increase in HT CTE levels off for increasing concentrations of $Li_2O$.

TABLE 1

| | Substitution of $Li_2O$ for $Na_2O$ | | | | | | |
|---|---|---|---|---|---|---|---|
| (Mol %) | 1 | 2 | 3 | 4 | 5 | 6 | 7 |
| $SiO_2$ | 69.4 | 69.4 | 69.4 | 69.4 | 69.4 | 69.4 | 69.4 |
| $Al_2O_3$ | 11.2 | 11.2 | 11.2 | 11.2 | 11.2 | 11.2 | 11.2 |
| $B_2O_3$ | 0.3 | 0.3 | 0.3 | 0.3 | 0.3 | 0.3 | 0.3 |
| $Na_2O$ | 14.2 | 13.2 | 11.2 | 10.2 | 9.2 | 7.7 | 6.2 |
| $K_2O$ | 3.0 | 3.0 | 3.0 | 3.0 | 3.0 | 3.0 | 3.0 |
| $Li_2O$ | 1.0 | 2.0 | 4.0 | 5.0 | 6.0 | 7.5 | 9.0 |
| CaO | 0.3 | 0.3 | 0.3 | 0.3 | 0.3 | 0.3 | 0.3 |
| MgO | 0.3 | 0.3 | 0.3 | 0.3 | 0.3 | 0.3 | 0.3 |
| ZnO | 0.3 | 0.3 | 0.3 | 0.3 | 0.3 | 0.3 | 0.3 |
| $SnO_2$ | 0.2 | 0.2 | 0.2 | 0.2 | 0.2 | 0.2 | 0.2 |
| Softening pt, ° C. | 792 | 778 | 751 | 751 | 748 | 742 | 732 |
| HT CTE, ppm/° C. | 24.4 | 25.3 | 25.7 | 25.1 | 25 | 25.3 | 25.3 |

Figure 4:
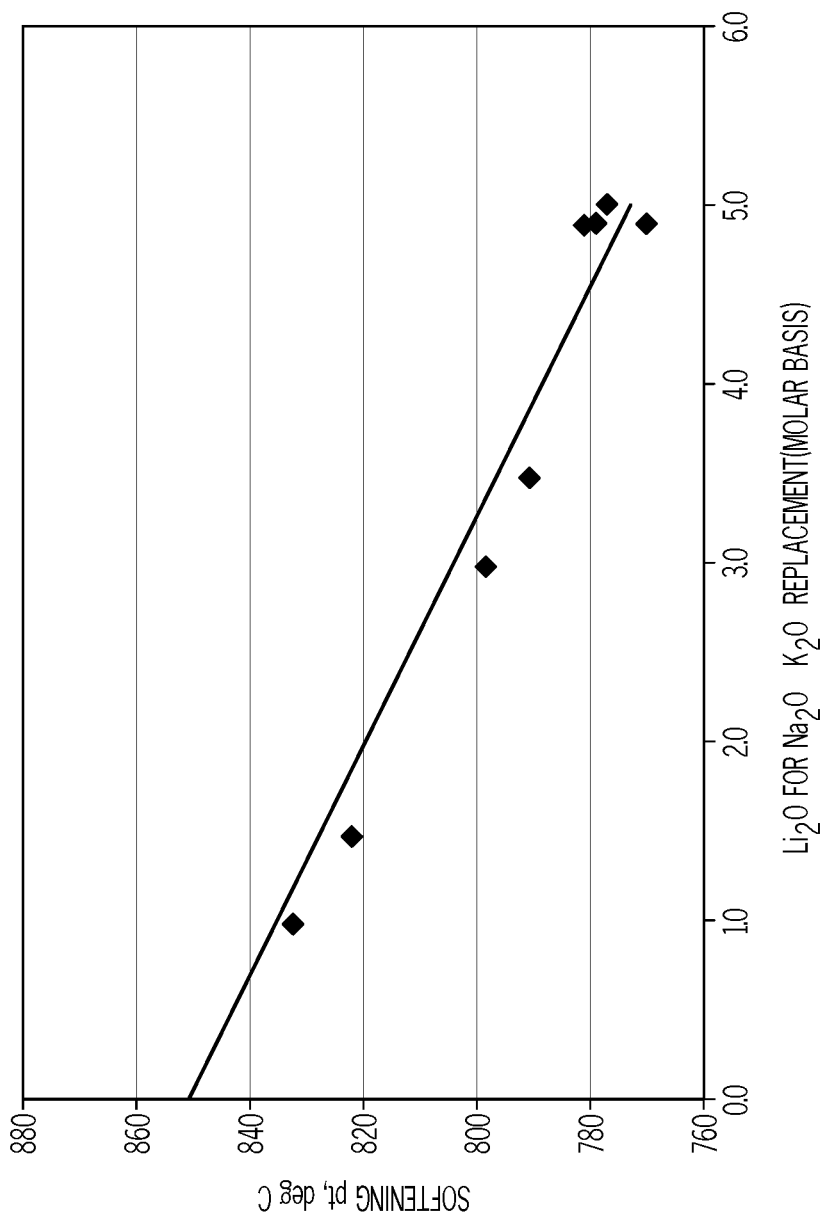
FIG. 4 graphically depicts the softening point (y-axis) as a function of the concentration of $Li_2O$ (x-axis) as $Li_2O$ is substituted for $Na_2O$ and $K_2O$ in an exemplary glass composition.
Figure 5:
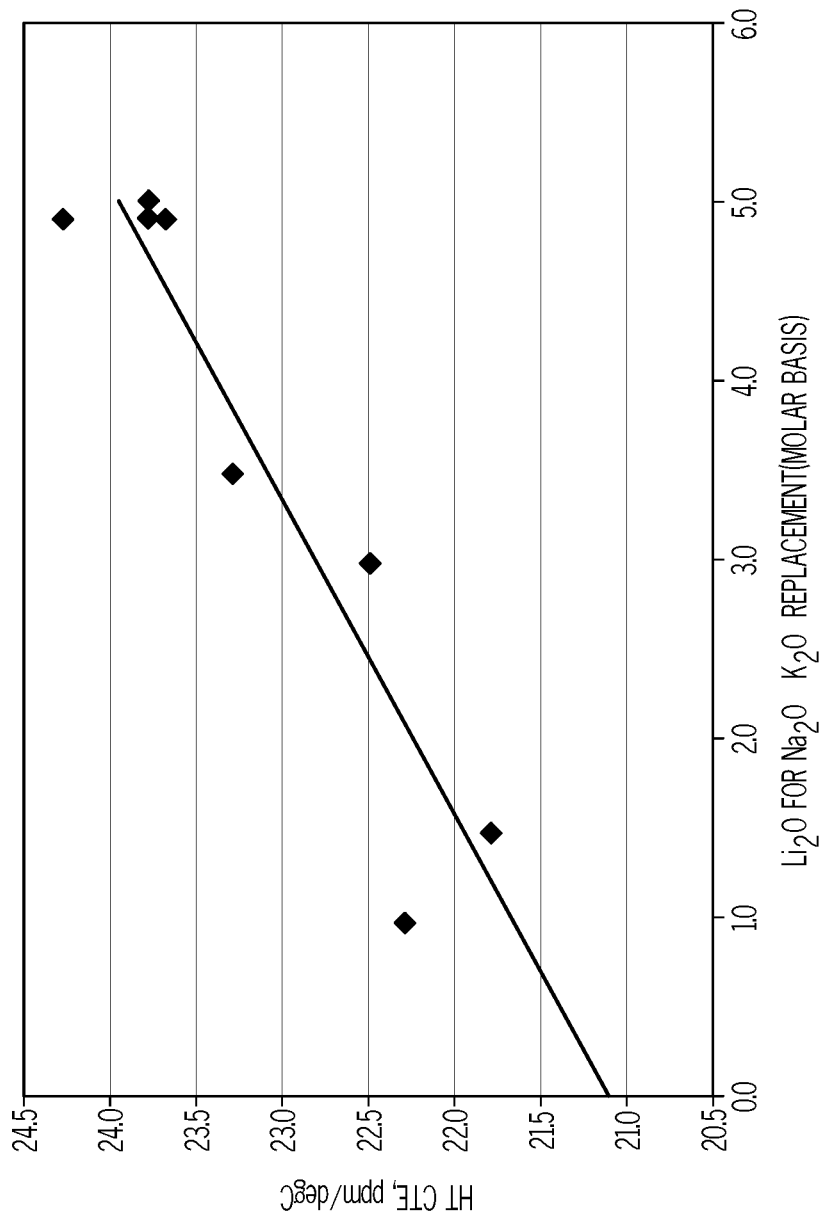
FIG. 5 graphically depicts the HT CTE (y-axis) as a function of the concentration of $Li_2O$ (x-axis) as $Li_2O$ is substituted for $Na_2O$ and $K_2O$ in an exemplary glass composition.

Referring now to Table 2, eight exemplary low boron glass compositions were prepared to investigate the effect of substituting $Li_2O$ for $Na_2O$ and $Na_2O + K_2O$ on softening point and HT CTE. FIG. 4 graphically depicts the softening point (y-axis) as a function of the concentration of $Li_2O$ (x-axis) as $Li_2O$ is substituted for $Na_2O+K_2O$. FIG. 5 graphically depicts the HT CTE (y-axis) as a function of the concentration of $Li_2O$ (x-axis) as $Li_2O$ is substituted for $Na_2O+K_2O$.

As indicated by the data in Table 2 and FIGS. 4 and 5, the partial substitution of $Li_2O$ for $Na_2O$ or $Na_2O+K_2O$ resulted in a progressive decrease in the softening point of the glass composition. In particular, substitution of 5 mol. % $Li_2O$ for $Na_2O+K_2O$ decreased the softening point by up to about 90° C. The substitution of $Li_2O$ for $Na_2O+K_2O$ also caused a slight increase in the HT CTE. However, even after the substitution, the HT CTE values of these compositions were less than $27 \times 10^{-6}/°$ C. No leveling of the HT CTE was observed as with the glass compositions of Table 2.

TABLE 2

Substitution of $Li_2O$ for $Na_2O$ and $K_2O$

| (Mol %) | C1 | C2 | 8 | 9 | 10 | 11 | 12 | 13 |
|---|---|---|---|---|---|---|---|---|
| $SiO_2$ | 69.8 | 69.8 | 69.8 | 69.8 | 69.8 | 69.8 | 69.8 | 69.8 |
| $Al_2O_3$ | 9.0 | 9.0 | 9.0 | 9.0 | 9.0 | 9.0 | 9.0 | 9.0 |
| $Li_2O$ | 1.0 | 1.5 | 3.0 | 3.5 | 4.9 | 4.9 | 4.9 | 5.0 |
| $Na_2O$ | 12.7 | 12.2 | 10.7 | 10.2 | 10.0 | 10.0 | 10.0 | 8.7 |
| $K_2O$ | 1.7 | 1.7 | 1.7 | 1.7 | 0.7 | 0.7 | 0.7 | 1.7 |
| MgO | 5.1 | 5.1 | 5.1 | 5.1 | 5.1 | 5.1 | 5.1 | 5.1 |
| CaO | 0.5 | 0.5 | 0.5 | 0.5 | 0.5 | 0.5 | 0.5 | 0.5 |
| $SnO_2$ | 0.2 | 0.2 | 0.2 | 0.2 | 0.3 | 0.3 | 0.2 | 0.2 |
| total $R_2O$ | 15.4 | 15.4 | 15.4 | 15.4 | 15.6 | 15.6 | 15.6 | 15.4 |
| softening pt | 833 | 822 | 799 | 791 | 770 | 779 | 781 | 777 |
| HT CTE | 22.3 | 21.8 | 22.5 | 23.3 | 24.3 | 23.8 | 23.7 | 23.8 |

Figure 6:
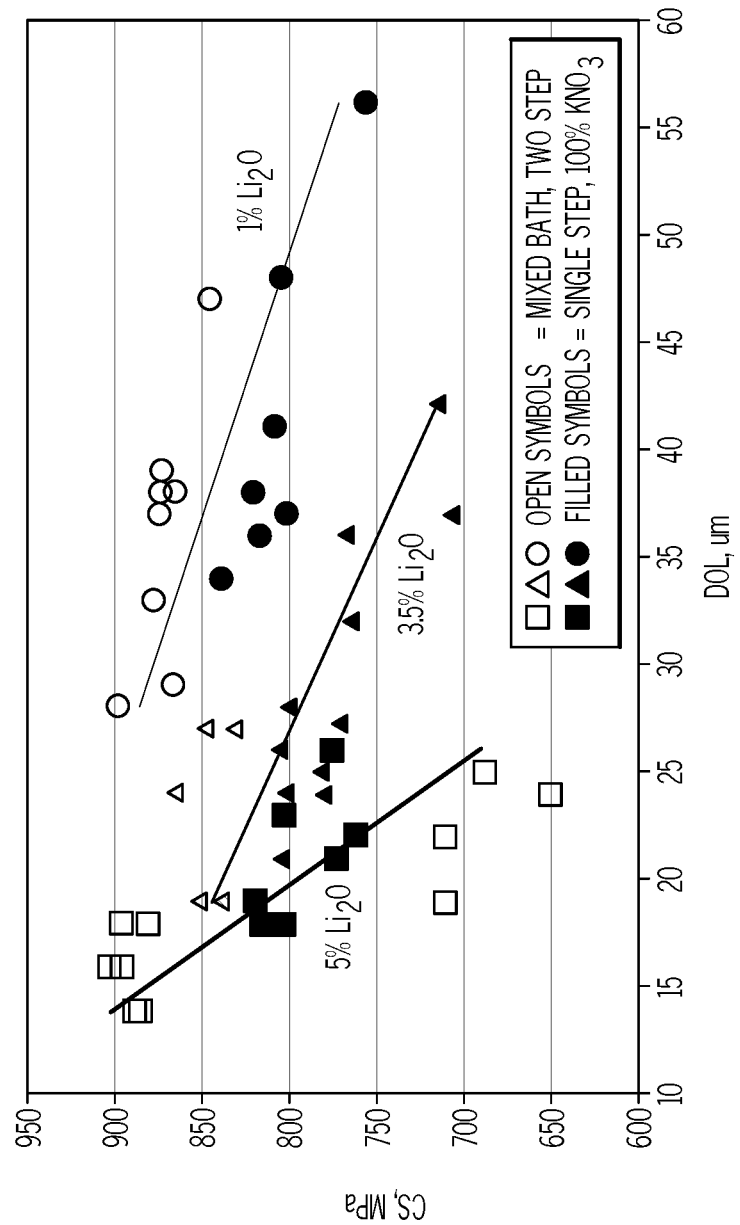
FIG. 6 graphically depicts the compressive stress and DOL values plotted for different $Li_2O$ concentrations.

Table 3 contains the post-ion exchange properties (compressive stress and DOL) for several of the exemplary glass compositions listed in Table 2 for a variety of different ion exchange processing conditions. The ion exchange conditions included single ion exchange treatments in 100% $KNO_3$ at a variety of temperature and immersion times, as well as two step treatments involving a mixed bath (e.g., 90% $KNO_3$-10% $NaNO_3$), followed by immersion in a second bath of 100% $KNO_3$. The compressive stress and DOL values shown in Table 3 are measured values obtained with a FSM instrument, with the compressive stress value being based on the measured stress optical coefficient (SOC). FIG. 6 graphically depicts the compressive stress (y-axis) and DOL (x-axis) for different $Li_2O$ concentrations (i.e., 1.0 mol. %, 3.5 mol. %, and 4.9 and 5.0 mol. % (collectively)). As shown in FIG. 6, a 40 μm DOL can be achieved for the 1% and 3.5% $Li_2O$ concentrations, but not for greater concentrations, thereby indicating that, at least for Li-for-Na substitution, there may be an effective upper limit to the amount of $Li_2O$ that can be introduced into the glass while still achieving the desired DOL.

TABLE 3

Ion Exchange Properties of Select Compositions

| | 9 | 11 | 12 | 13 |
|---|---|---|---|---|
| $Li_2O$ (mole %) | 3.5 | 4.9 | 4.9 | 5.0 |
| IX Schedule, CS (MPa), DOL (um) | | | | |
| 410-8 h 100$KNO_3$ | 836, 19 | | 820, 19 | |
| | 805, 21 | | | |
| 410-10 h 100$KNO_3$ | 803, 24 | 816, 18 | | |
| | 806, 26 | | | |
| 410-12 h 100$KNO_3$ | 783, 25 | | 803, 23 | |
| 410-15 h 100$KNO_3$ | 801, 28 | | 775, 26 | |
| 420-6 h 100$KNO_3$ | 782, 24 | 803, 18 | | |
| 420-8 h 100$KNO_3$ | 772, 27 | 773, 21 | 762, 22 | |
| 420-15 h 100$KNO_3$ | 765, 32 | | | |
| 430-15 h 100$KNO_3$ | 768, 36 | | | |
| | 707, 37 | | | |
| 440-15 100$KNO_3$ | 715, 42 | | | |
| 390-15 h 80$KNO_3$/20$NaNO_3$ + 430-1 h 100 $KNO_3$ | 853, 19 | 886, 14 | 904, 16 | |
| 390-15 h 90$KNO_3$/10$NaNO_3$ + 430-1 h 100 $KNO_3$ | | 889, 14 | 897, 16 | 710, 19 |
| 410-15 h 80$KNO_3$/20$NaNO_3$ + 430-1 h 100 $KNO_3$ | 759, 24 | 897, 18 | 882, 18 | 710, 22 |
| 410-15 h 90$KNO_3$/10$NaNO_3$ + 430-1 h 100 $KNO_3$ | 759, 27 | | 687, 25 | |
| | | | 649, 24 | |

Referring now to Table 4, Table 4 contains the compositional data and corresponding softening points, HT CTEs, and ion exchange characteristics of several inventive and comparative examples of low boron glass compositions.

TABLE 4

Low Boron Glass Compositions

| (Mol %) | C3 | C4 | 14 | 15 | 16 | 17 | 18 | 19 | 20 | 21 | 22 | C5 |
|---|---|---|---|---|---|---|---|---|---|---|---|---|
| $SiO_2$ | 65.8 | 65.8 | 67.8 | 67.8 | 65.8 | 69.4 | 69.4 | 69.4 | 69.6 | 68.2 | 67.3 | 65.9 |
| $Al_2O_3$ | 10.0 | 10.0 | 10.0 | 10.0 | 8.0 | 11.2 | 10.7 | 10.7 | 7.5 | 7.3 | 9.0 | 9.0 |
| $Li_2O$ | 4.0 | 3.0 | 3.0 | 3.0 | 3.0 | 3.0 | 1.0 | 3.0 | 2.1 | 2.1 | 3.5 | 3.5 |
| $Na_2O$ | 12.0 | 13.0 | 15.0 | 15.0 | 13.0 | 15.4 | 15.2 | 13.2 | 14.1 | 13.4 | 14.6 | 14.6 |
| $K_2O$ | 0 | 0 | 0 | 0 | 0 | 0 | 2.0 | 2.0 | 0 | 2.0 | 0.5 | 0.5 |
| MgO | 4.0 | 4.0 | 2.0 | 0 | 5.0 | 0.5 | 0.5 | 0.5 | 6.6 | 6.4 | 5.1 | 6.5 |
| CaO | 0 | 0 | 0 | 0 | 0 | 0 | 0 | 0 | 0 | 0.5 | 0 | 0 |
| ZnO | 4.0 | 4.0 | 2.0 | 4.0 | 5.0 | 0.5 | 0.5 | 0.5 | 0 | 0 | 0 | 0 |
| $P_2O_5$ | 0 | 0 | 0 | 0 | 0 | 0.8 | 0.8 | 0 | 0 | 0 | 0 | 0 |
| $SnO_2$ | 0.2 | 0.2 | 0.2 | 0.2 | 0.2 | 0.2 | 0.2 | 0.2 | 0.2 | 0.2 | 0.2 | 0.2 |
| MgO + ZnO | 8.0 | 8.0 | 4.0 | 4.0 | 10.0 | 1.0 | 1.0 | 1.0 | 6.6 | 6.4 | 5.1 | 6.5 |
| $Al_2O_3$ + MgO + ZnO | 18.0 | 18.0 | 14.0 | 14.0 | 18.0 | 12.2 | 11.7 | 11.7 | 14.1 | 13.7 | 14.1 | 15.5 |
| Softening pt, ° C. | 778 | 785 | 757 | 764 | 752 | 775 | 802 | 785 | 781 | 747 | 750 | 742 |

TABLE 4-continued

Low Boron Glass Compositions

| (Mol %) | C3 | C4 | 14 | 15 | 16 | 17 | 18 | 19 | 20 | 21 | 22 | C5 |
|---|---|---|---|---|---|---|---|---|---|---|---|---|
| HT CTE, ppm/° C. | 24.0 | 21.8 | 24.2 | 24.3 | | 24.0 | 22.7 | 23.2 | 23.9 | 25.6 | 26.6 | 25.6 |
| IX, 430-15 h (100 KNO$_3$) | | | | | | | | | | | | |
| CS (MPa) | 868 | 950 | 637 | | 872 | | | | | | | |
| DOL (um) | 31 | 32 | 43 | | 28 | | | | | | | |
| IX, 430-15 h (100 KNO$_3$) | | | | | | | | | | | | |
| CS (MPa) | 796 | 893 | 587 | | | | | | | | | |
| DOL (um) | 36 | 37 | 50 | | | | | | | | | |
| IX, 410-15 h (90 KNO$_3$/10 NaNO$_3$) | | | | | | | | | | | | |
| CS (MPa) | | | | | | | 690 | 720 | | | 662 | 760 |
| DOL (um) | | | | | | | 62 | 48 | | | 38 | 34 |

Referring now to Table 5, a series of low boron glass composition containing zirconia were also formed. The softening points of these glass compositions were less than 800° C. and the HT CTEs were less than 27×10$^{-6}$/° C. Following ion exchange in a salt bath of 100% KNO$_3$ at 440° C. for 15 hours the glass compositions had a compressive stress greater than 700 MPa and a depth of layer of 40 μm.

TABLE 5

Glass Compositions with Zirconia Additions

| (Mol %) | 23 | 24 | 25 | 26 | 27 | 28 |
|---|---|---|---|---|---|---|
| SiO$_2$ | 65.9 | 65.4 | 65.9 | 65.9 | 65.9 | 64.9 |
| Al$_2$O$_3$ | 9 | 9 | 9 | 8 | 8.5 | 8.5 |
| Li$_2$O | 3.5 | 3.5 | 3.5 | 3.5 | 3.5 | 3.5 |
| Na$_2$O | 14.6 | 14.6 | 16.1 | 16.1 | 16.1 | 16.1 |
| K$_2$O | 0.5 | 0.5 | 0.5 | 0.5 | 0.5 | 0.5 |
| MgO | 5.5 | 3 | 3.5 | 3.5 | 3 | 3 |
| ZnO | 0 | 3 | 0 | 0.5 | 1 | 2 |
| P$_2$O$_5$ | 0 | 0 | 0 | 1 | 0 | 0 |
| ZrO$_2$ | 1 | 1 | 1.5 | 1 | 1.5 | 1.5 |
| SnO$_2$ | 0.2 | 0.2 | 0.2 | 0.2 | 0.2 | 0.2 |
| Soft pt (° C.) | 771 | 758 | 752 | 751 | 744 | 744 |
| HT CTE (ppm) | 24.6 | 24.4 | 25.0 | 26.1 | 25.4 | 25.3 |
| IX (100% KNO$_3$ @ 440° C. for 15 hrs) CS, DOL | 665, 43 | 721, 42 | 505, 49 | 440, 63 | 489, 49 | 523, 46 |

Referring to Table 6, two inventive compositions (29 and 30) were subjected to additional characterization and a determination of whether the glass compositions would be suitable for use with fusion forming processes. Table 6 contains the composition and properties of the inventive compositions as well as two comparative examples of ion exchangeable glass compositions suitable for use with a fusion forming process. The inventive low boron glass compositions had softening points that are approximately 40° C. lower than the softening points of the comparative glass compositions. Further, the HT CTE values of the low boron glass compositions are comparable to or less than the HT CTE values of the comparative glass compositions. The inventive low boron glass compositions have similar ion exchange properties as well as high temperature viscosities, liquidus temperatures, liquidus viscosities and zircon breakdown temperatures as the comparative glass compositions indicating that the inventive low boron glass compositions would be suitable for use with fusion forming processes.

TABLE 6

Forming Characteristics of Inventive and Comparative Glass Compositions

| Mol % | C6 | C7 | 29 | 30 |
|---|---|---|---|---|
| SiO$_2$ | 66.0 | 69.2 | 69.8 | 66.8 |
| Al$_2$O$_3$ | 10.3 | 8.5 | 9.2 | 10.0 |
| B$_2$O$_3$ | 0.6 | 0 | 0 | 0 |
| Li$_2$O | 0 | 0 | 3.5 | 3.0 |
| Na$_2$O | 14.2 | 13.9 | 11.9 | 14.0 |
| K$_2$O | 2.4 | 1.2 | 0.5 | 0 |
| MgO | 5.8 | 6.5 | 5.1 | 3.0 |
| CaO | 0.6 | 0.5 | 0 | 0 |
| ZnO | 0 | 0 | 0 | 3.0 |
| SnO$_2$ | 0.2 | 0.2 | 0.2 | 0 |
| soft pt | 837 | 844 | 799 | 781 |
| HT CTE | 23.0 | 21.0 | 22.6 | 24.0 |
| DOL | 40 | 40 | 40 | 44 |
| CS | 740 | 740 | 680 | 785 |
| HTV: 200 P | 1588 | 1640 | 1609 | 1567 |
| HTV: 35 kP | 1131 | 1145 | 1117 | 1084 |
| delta | 457 | 495 | 492 | 483 |
| Liquidus temp | 900 | 950 | 965 | 970° |
| Liquidus viscosity | >1e6 | >1e6 | 500 kP | 275 kP |
| viscosity (RT) | 2.461 | 2.444 | 2.438 | 2.497 |

Referring now to Table 7, Table 7 contains the compositional data and corresponding softening points and HT CTEs for inventive and comparative high boron glass compositions. As shown in Table 7, the inventive glass compositions generally have greater than about 5 mol. % and, in the examples shown, up to about 10 mol % B$_2$O$_3$. However, for the inventive high boron glass compositions shown in Table 7, the ratio R$_2$O:Al$_2$O$_3$ is generally greater than or equal to about 0.9 and less than or equal to about 1.15.

Comparative Example C8 does not contain Li$_2$O and, as a result, the softening point for this glass is greater than the inventive high boron glass compositions illustrating the need to have Li$_2$O in the glass compositions.

TABLE 7

High Boron Glass Compositions

| (Mol %) | C8 | 31 | 32 | 33 | 34 | 35 | 36 | 37 |
|---|---|---|---|---|---|---|---|---|
| SiO$_2$ | 64.2 | 60 | 58.6 | 65.7 | 65.7 | 65.7 | 65.2 | 63.7 |
| Al$_2$O$_3$ | 12.0 | 14.4 | 13.8 | 12.3 | 12.3 | 11.3 | 12.3 | 12.3 |
| B$_2$O$_3$ | 9.0 | 5.2 | 5.1 | 9.1 | 9.1 | 9.1 | 9.1 | 9.1 |
| Li$_2$O | 0 | 6.1 | 4.9 | 5.0 | 7.0 | 5.0 | 5.0 | 5.0 |
| Na$_2$O | 11.3 | 7.6 | 8.2 | 6.6 | 4.6 | 6.6 | 6.6 | 6.6 |
| K$_2$O | 0.5 | 0.5 | 0.5 | 1.3 | 1.3 | 1.3 | 1.3 | 1.3 |
| MgO | 1.5 | 2.7 | 2.7 | 0 | 0 | 1 | 0 | 0 |
| CaO | 0 | 0 | 0 | 0 | 0 | 0 | 0 | 0 |
| ZnO | 1.5 | 3.5 | 3.9 | 0 | 0 | 0 | 0 | 0 |
| P$_2$O$_5$ | 0 | 0 | 2.3 | 0 | 0 | 0 | 0.5 | 2 |
| SnO$_2$ | 0.3 | 0.3 | 0.3 | 0.0 | 0.0 | 0.1 | 0.1 | 0.1 |
| R$_2$O/Al$_2$O$_3$ | 0.98 | 0.99 | 0.99 | 1.05 | 1.05 | 1.14 | 1.05 | 1.05 |
| softening pt. | 845 | 770 | 781 | 785 | 786 | 745 | 795 | 789 |
| HT CTE | 24.6 | 26.7 | 25.4 | 26.7 | | 31.4 | 25.1 | 26.0 |

Referring now to Table 8, five glass compositions were formulated containing the color modifying constituents TiO$_2$ and Fe$_2$O$_3$ to produce an opaque, black glass. Inventive compositions 38-41 were based on composition 31 from Table 7 and inventive composition 42 was based on composition 34 of Table 7. The alkali to alumina ratio of each glass composition was less than 1.15 and greater than 1.0. Plate samples having a thickness of 0.8 mm were produced and measured. Each of compositions 39-42 exhibited a softening point of less than about 810° C. with composition 38 having a softening point of approximately 814° C. which is about 810° C. given the measurement error (+/−5° C.) of the instrument. Compositions 38 and 41-42 also exhibited an HT CTE of less than or equal to about 27×10$^{-6}$/° C. (the HT CTE for compositions 39 and 40 was not measured). Each sample was annealed at 570° C. for 2 hours, cooled to room temperature and heat treated at 640° C. for 4 hours to produce the black color. The opacity of the samples was qualitatively assessed by shining a light source on the surface of the plate and qualitatively determining if the light was transmitted through the other side of the plate. As indicated in Table 8, all samples appeared opaque based on this qualitative assessment. In addition the L, a*, b*, coordinates were determined for compositions 38, 41, and 42 using an X-Rite CI7 Spectro-Photometer. Samples of compositions 41 and 42 were also ion exchanged in a 100% KNO$_3$ salt bath at 430° C. for 15 hours. It was determined that the resultant depth of layer of potassium diffusion in each sample was greater than 30 μm.

TABLE 8

High Boron Glass Compositions with Color Modifying Constituents

| (Mol %) | 38 | 39 | 40 | 41 | 42 |
|---|---|---|---|---|---|
| SiO$_2$ | 61.0 | 62.0 | 62.0 | 63.5 | 65.7 |
| Al$_2$O$_3$ | 13.4 | 13.8 | 13.9 | 13.9 | 12.3 |
| B$_2$O$_3$ | 5.2 | 5.2 | 5.2 | 5.2 | 9.1 |
| Li$_2$O | 3.5 | 3.5 | 3.7 | 3.7 | 3.5 |
| Na$_2$O | 10.2 | 10.7 | 10.7 | 10.7 | 8.9 |
| K$_2$O | 0.5 | 0.5 | 0 | 0.5 | 0.5 |
| MgO | 2.7 | 3.3 | 3.0 | 2.0 | 0 |
| ZnO | 3.5 | 1.0 | 1.0 | 0.5 | 0.0 |
| TiO$_2$ | 1.0 | 1.0 | 1.0 | 1.0 | 1.0 |
| Fe$_2$O$_3$ | 0.75 | 0.75 | 0.75 | 0.75 | 0.75 |
| SnO$_2$ | 0.2 | 0.1 | 0.1 | 0 | 0.1 |
| R$_2$O/Al$_2$O$_3$ | 1.06 | 1.07 | 1.04 | 1.07 | 1.05 |
| Soft pt, ° C. | 814 | | 794 | 799 | 802 |
| HT CTE, ppm/° C. | 21.7 | | | 27.0 | 24.8 |

TABLE 8-continued

High Boron Glass Compositions with Color Modifying Constituents

| (Mol %) | 38 | 39 | 40 | 41 | 42 |
|---|---|---|---|---|---|
| Opaque to snake light? (0.8 mm thick; 570° anneal) | yes | yes | yes | yes | yes |
| Color coordinates (CIE F2, 10° diffuse, reflectance), 0.8 mm thick (570° anneal) | | | | | |
| L | 0.20 | | | 0.785 | 0.54 |
| a* | −0.50 | | | −0.21 | 0.06 |
| b* | −0.11 | | | −1.08 | −0.16 |
| IX, 430°-15 hr 100 KNO$_3$, DOL (um) | | | | 35 | 36 |

Referring now to Table 9, a series of glass compositions were formulated to assess the effects of the alkali (R$_2$O) to alumina (Al$_2$O$_3$) ratio on forming black glasses. As shown in Table 9, 6 glass compositions were formulated with increasing R$_2$O:Al$_2$O$_3$ ratios. The glass compositions were formed into 0.8 mm glass plates, annealed at 570° C. for 2 hours, cooled to room temperature, and heat treated at 640° C. for 4 hours. Comparative compositions C9 and C10 did not result in an opaque glass using the qualitative assessment described above. Moreover, the softening points of these samples were much greater than 810° C. Comparative composition C12 did not result in an opaque glass using the qualitative assessment described above and the HT CTE of the sample was greater than 27×10$^{-6}$/° C. While comparative composition C11 resulted in an opaque glass, the HT CTE of the sample was greater than 27×10$^{-6}$/° C. Inventive composition 43 and 44 both yielded opaque glasses using the qualitative assessment described above and both had HT CTEs less than 27×10$^{-6}$/° C. The softening point of inventive composition 43 was measured at 812° C. which is approximately 810° C. given the measurement error (+/−5° C.) of the instrument.

TABLE 9

High Boron Glass Compositions With Varying R$_2$O:Al$_2$O$_3$ Ratios

| (Mol %) | C9 | C10 | 43 | 44 | C11 | C12 |
|---|---|---|---|---|---|---|
| SiO$_2$ | 63.5 | 63.5 | 63.5 | 63.5 | 63.5 | 63.5 |
| Al$_2$O$_3$ | 14.7 | 14.4 | 14.1 | 13.85 | 13.6 | 13.2 |

TABLE 9-continued

High Boron Glass Compositions With Varying $R_2O:Al_2O_3$ Ratios

| (Mol %) | C9 | C10 | 43 | 44 | C11 | C12 |
|---|---|---|---|---|---|---|
| $B_2O_3$ | 5.2 | 5.2 | 5.2 | 5.2 | 5.2 | 5.2 |
| $Li_2O$ | 3.5 | 3.6 | 3.7 | 3.7 | 3.8 | 3.9 |
| $Na_2O$ | 10.2 | 10.4 | 10.6 | 10.8 | 10.9 | 11.2 |
| $K_2O$ | 0.4 | 0.4 | 0.4 | 0.45 | 0.5 | 0.5 |
| MgO | 2.0 | 2.0 | 2.0 | 2.0 | 2.0 | 2.0 |
| ZnO | 0.5 | 0.5 | 0.5 | 0.5 | 0.5 | 0.5 |
| $TiO_2$ | 1.0 | 1.0 | 1.0 | 1.0 | 1.0 | 1.0 |
| $Fe_2O_3$ | 0.75 | 0.75 | 0.75 | 0.75 | 0.75 | 0.75 |
| $R_2O/Al_2O_3$ | 0.96 | 1.00 | 1.04 | 1.08 | 1.12 | 1.18 |
| Soft pt, ° C. | 837 | 824 | 812 | 804 | 794 | 776 |
| HT CTE. ppm/° C. | 24.6 | 25.5 | 26.5 | 26.8 | 27.4 | 31.1 |
| Opaque to snake light? (0.8 mm thick)** | no | no | yes | yes | yes | no |
| Color coordinates (CIE F2, 10° diffuse, reflectance), 0.8 mm thick* | | | | | | |
| L | 4.41 | 4.56 | 4.01 | 4.25 | 4.21 | 7.99 |
| a* | −1.21 | −1.23 | −1.08 | −1.19 | −1.17 | −1.52 |
| b* | −4.92 | −4.93 | −4.54 | −4.77 | −4.78 | −6.14 |

**(570-2 hr anneal + 640-4 hr heat-treat)

Figure 7:
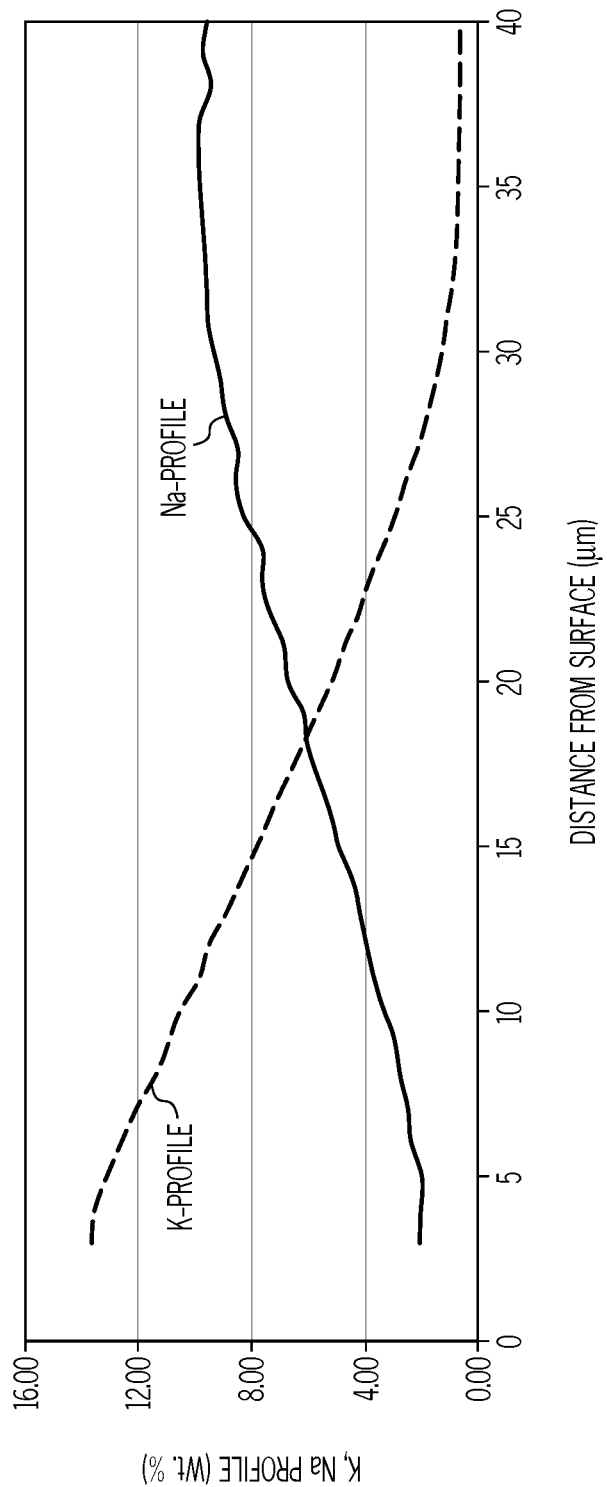
FIG. 7 graphically depicts the concentration of potassium and sodium ions (y-axis) as a function of depth (x-axis) for an ion-exchanged glass plate formed from an exemplary glass composition containing color modifying constituents.

Referring now to Table 10, glass plates formed from composition 41 of Table 8 were prepared and heat treated under different conditions. Some of these samples were also ion exchanged to assess the benefit of strengthening glass formed from a glass composition containing color modifying constituents. Specifically, a first set of 17 plates formed from inventive composition 41 and having a thickness of 0.83 mm were annealed at 570° C. for 2 hours. A second set of 17 plates formed from inventive composition 41 and having a thickness of 0.83 mm were annealed at 570° C. for 2 hours, cooled to room temperature, and then ion exchanged in a salt bath of 100% $KNO_3$ at 440° C. for 15 hours. A third set of 12 plates formed from inventive composition 41 and having a thickness of 0.80 mm were annealed at 570° C. for 2 hours, cooled to room temperature, and then heat treated at 640° C. for 4 hours. A fourth set of 15 plates formed from inventive composition 41 and having a thickness of 0.80 mm were annealed at 570° C. for 2 hours, cooled to room temperature, heat treated at 640° C. for 4 hours, and then ion exchanged in a salt bath of 100% $KNO_3$ at 440° C. for 15 hours. The concentration of sodium and potassium ions for one plate as a function of depth into the plate is graphically depicted in FIG. 7 indicating that the depth of layer induced by ion exchange was approximately 30 μm. Each of the plates was tested in un-abraded condition using a ring-on-ring testing protocol according to ASTM Standard C1499 in order to assess the degree of strengthening achieved by ion exchange. For purposes of comparison, 15 glass plates formed from Corning glass code 2318 (ion exchange strengthened borosilicate glass sold by Corning Inc. under the trademark Gorilla Glass™) were tested according to the same testing protocol. A Weibull distribution for each set of glass plates was constructed and the characteristic strength and Weibull modulus were determined.

As shown in Table 10, the inventive glass composition 41 had a significant increase in strength following ion exchange in both the annealed condition and the annealed and heat treated condition. This resulted in a degree of strengthening similar to that of found in Corning glass code 2318.

TABLE 10

Ring-On-Ring Testing Strength At Failure

| Treatment | Thickness (mm) | Number of Samples | Strength at Failure (Mean ± 1 S.D. (% CV)) | Characteristic Strength (So) | Weibull modulus (m) |
|---|---|---|---|---|---|
| Annealed (570-2 h), NIX | 0.83 | 17 | 412 ± 62 (14.9%) | 438 | 7.5 |
| Annealed (570-2 h), IX (440-15 h, 100 KNO3) | 0.83 | 17 | 1852 ± 146 (7.9%) | 1920 | 13.8 |
| Annealed (570-2 h), Heat-treated (640-4 h), NIX | 0.80 | 12 | 317 ± 85 (26.8%) | 352 | 3.7 |
| Annealed (570-2 h), Heat-treated (640-4 h), IX (440-15 h, 100 KNO3) | 0.80 | 15 | 1763 ± 151 (8.6%) | 1832 | 12.5 |
| Control - 2318 IX | 1.00 | 15 | 1390 ± 320 (23.0%) | 1518 | 4.1 |

It should now be understood that the glass compositions described herein are suitable for use in conjunction with elevated temperature forming processes for shaping the glass compositions into 3-D shaped glass articles. Specifically, the relatively low softening points of the glass compositions described herein (i.e., softening points of less than or equal to about 810° C.) decrease the interaction between the mold and the glass composition during elevated temperature shaping thereby improving the formability of the glass composition and also increasing the service life of the corresponding mold.

Further, the glass compositions described herein also exhibit a relatively low high temperature coefficient of thermal expansion above the glass transition temperature (i.e., an HT CTE of less than or equal to about 27×10$^{-6}$/° C.). The relatively low HT CTE provides the glass compositions good dimensional control of the glass composition following elevated temperature forming processes.

While the glasses described herein have relatively low softening points and relatively low HT CTEs, the glass compositions are also ion exchangeable. For example, the glass compositions described herein may be ion exchange strengthened to achieve a depth of layer of greater than or equal to about 25 μm and a compressive stress of about 650 MPa following immersion in a molten salt bath comprising $KNO_3$ at about 410° C. for less than or equal to approximately 15 hours.

Further, the glass compositions described herein have liquidus viscosities and viscosities lower than about 200 P at about 1620° C. such that the glass compositions are compatible with fusion draw processes and are easily melted.

It should now be understood that several aspects of glass articles and glass compositions are disclosed herein. In a first aspect, a glass article comprising $SiO_2$, $Al_2O_3$, $Li_2O$ and $Na_2O$ has a softening point less than or equal to about 810° C.; a high temperature CTE less than or equal to about $27 \times 10^{-6}$/° C.; and a compressive stress greater than or equal to about 600 MPa and a depth of layer greater than or equal to about 25 μm after ion exchange in a salt bath comprising $KNO_3$ in a temperature range from about 390° C. to about 450° C. for less than or equal to approximately 15 hours.

In a second aspect, the glass article of the first aspect has L, a*, b*, color coordinates of L from about 0 to about 5.0, a* from about −2.0 to about 2.0, and b* from about 0 to about −5.0.

In a third aspect, the glass article of any of the first or second aspects has an opacity greater than or equal to about 80% over a range of wavelengths from about 350 nm to about 750 nm.

In a fourth aspect, the glass article of any of the first through third aspects comprises from about 65 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; from about 0 mol. % to about 5 mol. % $K_2O$; from about 0.8 to about 10 mol. % of a divalent oxide, wherein the divalent oxide comprises at least one of MgO and ZnO; and less than about 0.5 mol. % $B_2O_3$, wherein a sum of a concentration of $Al_2O_3$ (mol. %), and a concentration of the divalent oxide (mol. %) is greater than about 10 mol %.

In a fifth aspect, the glass article of the fourth aspect further comprises from about 0.5 mol. % to about 2.0 mol. % $ZrO_2$.

In a sixth aspect, the glass article of any of the fourth or fifth aspects comprises from about 0 mol. % to about 3 mol. % $P_2O_5$.

In a seventh aspect, the glass article of any of the fourth through sixth aspects is substantially free of $ZrO_2$.

In an eighth aspect, the glass article of the seventh aspect comprises from about 65.8 mol. % to about 71 mol. % $SiO_2$.

In a ninth aspect, the glass article of any of the first through third aspects comprises from about 55 mol. % to about 68 mol. % $SiO_2$; from about 9 mol. % to about 15 mol. % $Al_2O_3$; from about 4.5 mol % to about 12 mol. % $B_2O_3$; from about 1 mol. % to about 7 mol. % $Li_2O$; from about 3 mol. % to about 12 mol. % $Na_2O$; and from about 0 mol. % to about 3 mol % $K_2O$. In this ninth aspect, $R_2O$ is a sum of a concentration of $Li_2O$, a concentration of $Na_2O$, and a concentration of $K_2O$, and a ratio of $R_2O$ to a concentration of $Al_2O_3$ is less than or equal to about 1.15.

A tenth aspect includes the glass article of the ninth aspect wherein the ratio of $R_2O$ to the concentration of $Al_2O_3$ is greater than or equal to about 1.02.

In an eleventh aspect, the glass article of any of the ninth or tenth aspects further comprises $TiO_2$ and $Fe_2O_3$.

A twelfth aspect includes the glass article of the eleventh aspect, wherein a ratio of $Fe_2O_3$ (mol. %) to $TiO_2$ (mol. %) is greater than or equal to about 0.52 and less than or equal to about 1.22.

In a thirteenth aspect, a glass composition includes from about 65.8 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; from about 0.8 to about 10 mol. % of a divalent oxide, wherein the divalent oxide is at least one of MgO and ZnO; and less than about 0.5 mol. % $B_2O_3$. A sum of a concentration of $Al_2O_3$ (mol. %) and a concentration of the divalent oxide (mol. %) is greater than about 10 mol %. The glass composition has a softening point less than or equal to about 810° C. The glass composition also has a high temperature CTE less than or equal to about $27 \times 10^{-6}$/° C. This glass composition may be substantially free from $ZrO_2$.

A fourteenth aspect includes the glass composition of the thirteenth aspect, wherein the glass composition is substantially free of $B_2O_3$.

In a fifteenth aspect, the glass composition of any of the thirteenth through fourteenth aspects has a high temperature CTE is less than or equal to about $25 \times 10^{-6}$/° C.

In a sixteenth aspect, the glass composition of any of the thirteenth through fourteenth aspects further includes from about 0 mol. % to about 7 mol. % MgO; from about 0 mol. % to about 1 mol. % CaO; and from about 0 mol. % to about 6 mol. % ZnO.

In a seventeenth aspect, the glass composition of the sixteenth aspect has a concentration of MgO is greater than or equal to about 3 mol. % and less than or equal to about 5 mol. %.

In an eighteenth aspect, the glass composition of any of the thirteenth through seventeenth aspects includes a concentration of $SiO_2$ from about 68 mol. % to about 71 mol. %.

In a nineteenth aspect, a glass composition includes from about 55 mol. % to about 68 mol. % $SiO_2$; from about 9 mol. % to about 15 mol. % $Al_2O_3$; from about 4.5 mol % to about 12 mol. % $B_2O_3$; from about 1 mol. % to about 7 mol. % $Li_2O$; from about 3 mol. % to about 12 mol. % $Na_2O$; and from about 0 mol. % to about 3 mol % $K_2O$. In this aspect, $R_2O$ is a sum of a concentration of $Li_2O$, a concentration of $Na_2O$, and a concentration of $K_2O$, and a ratio of $R_2O$ to a concentration of $Al_2O_3$ is less than or equal to about 1.15. The glass composition may have a softening point less than or equal to about 810°. The glass composition may also have a high temperature CTE less than or equal to about $27 \times 10^{-6}$/° C.

A twentieth aspect includes the glass composition of the nineteenth aspect, wherein the softening point is less than or equal to about 800° C.

A twenty-first aspect includes the glass composition of any of the nineteenth through twentieth aspects wherein the high temperature CTE is less than or equal to about $25 \times 10^{-6}$/° C.

A twenty-second aspect includes the glass composition of any of the nineteenth through twentieth aspects wherein the ratio of $R_2O$ to the concentration of $Al_2O_3$ is greater than or equal to about 1.02 and the glass composition further comprises $TiO_2$ and $Fe_2O_3$.

A twenty-third aspect includes the glass composition of any of the nineteenth through twenty-second aspects wherein a ratio of $Fe_2O_3$ (mol. %) to $TiO_2$ (mol. %) is greater than or equal to about 0.52 and less than or equal to about 1.22.

A twenty-fourth aspect includes the glass composition of any of the nineteenth through twenty-third aspects, wherein the glass composition further comprises from about 0 mol. % to about 5 mol. % MgO; from about 0 mol. % to about 5 mol. % ZnO; and from about 0 mol. % to about 2 mol. % CaO.

A twenty-fifth aspect includes the glass composition of any of the nineteenth through twenty-fourth aspects, wherein a concentration of $B_2O_3$ is greater than or equal to 7 mol. % and less than or equal to 12 mol. %.

A twenty-sixth aspect includes the glass composition of any of the nineteenth through twenty-fifth aspects, wherein the glass composition comprises from about 0 mol. % to about 3 mol. % $P_2O_5$.

A twenty-seventh aspect includes a glass composition comprising from about 65 mol. % to about 71 mol. % $SiO_2$; from about 7 mol. % to about 12 mol. % $Al_2O_3$; from about 1 mol. % to about 9 mol. % $Li_2O$; from about 6 mol. % to about 16 mol. % $Na_2O$; from about 0 mol. % to about 5 mol. % $K_2O$; from about 0.8 to about 10 mol. % of a divalent oxide, wherein the divalent oxide comprises at least one of MgO and ZnO; from about 0 mol. % to about 3 mol. % $P_2O_5$, from about 0.5 mol. % to about 2 mol. % $ZrO_2$; and less than about 0.5 mol. % $B_2O_3$. In this aspect, a sum of a concentration of $Al_2O_3$ (mol. %), and a concentration of the divalent oxide (mol. %) is greater than about 10 mol %. The glass composition may have a softening point less than or equal to about 810° C. The glass composition may also have a high temperature CTE less than or equal to about $27 \times 10^{-6}$/° C.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
   from about 65 mol. % to about 71 mol. % $SiO_2$;
   from about 7 mol. % to about 12 mol. % $Al_2O_3$;
   from about 0 mol. % to about 3 mol. % $P_2O_5$;
   from about 1 mol. % to about 9 mol. % $Li_2O$;
   less than 16 mol. % $Na_2O$; and
   from about 0 mol. % to about 3 mol % $K_2O$;
   from 0.8 mol. % to 10 mol. % of a divalent oxide, wherein the divalent oxide comprises MgO, 0 mol. % ZnO, and greater than 0 mol. % to 1 mol. % CaO, wherein:
   the glass composition has a softening point less than or equal to about 810° C.; and
   the glass composition has a high temperature CTE less than or equal to about $27\text{–}10^{-6}$/° C.

2. The glass composition of claim 1, wherein the softening point is less than or equal to about 800° C.

3. The glass composition of claim 1, wherein the high temperature CTE is less than or equal to about $25\text{–}10^{-6}$/° C.

4. The glass composition of claim 1, wherein the sum of the concentration of $Al_2O_3$ (mol. %) and the concentration of the divalent oxide (mol. %) is greater than or equal to about 10 mol. %.

5. The glass composition of claim 4, further comprising $B_2O_3$ in an amount less than or equal to about 1 mol. %.

6. The glass composition of claim 5, further comprising from about 0.5 mol. % to about 2 mol. % $ZrO_2$.

7. The glass composition of claim 1, wherein MgO is present in an amount less than or equal to about 7 mol. %.

8. The glass composition of claim 1 comprising from about 2 mol. % to about 4 mol. % MgO.

* * * * *

UNITED STATES PATENT AND TRADEMARK OFFICE
CERTIFICATE OF CORRECTION

PATENT NO. : 11,124,444 B2
APPLICATION NO. : 16/181893
DATED : September 21, 2021
INVENTOR(S) : Marie Jacqueline Monique Comte et al.

It is certified that error appears in the above-identified patent and that said Letters Patent is hereby corrected as shown below:

On the Title Page

In Column 2, item (56), Other Publications, Line 14, delete "MAlSi3O8" and insert -- $MAlSi_3O_8$ --, therefor.

On page 2, in Column 2, item (56), Other Publications, Lines 3-4, delete "SiO2-R2O3-R2O" and insert -- $SiO_2$-$R_2O_3$-$R_2O$ --, therefor.

On page 2, in Column 2, item (56), Other Publications, Line 7, delete "Li2O-Na2O-Al2O3-SiO2";" and insert -- $Li_2O$-$Na_2O$-$Al_2O_3$-$SiO_2$"; --, therefor.

In the Specification

In Column 1, Line 10, delete "Application application" and insert -- application --, therefor.

In the Claims

In Column 28, Line 8, Claim 1, delete "mol %" and insert -- mol. % --, therefor.

In Column 28, Line 15, Claim 1, delete "27-10-$^{6°}$ C." and insert -- $27 \times 10^{-6}$/° C. --, therefor.

In Column 28, Line 19, Claim 3, delete "25-10-$^{6°}$ C." and insert -- $25 \times 10^{-6}$/° C. --, therefor.

Signed and Sealed this
Nineteenth Day of April, 2022

Katherine Kelly Vidal
*Director of the United States Patent and Trademark Office*